United States Patent
Papas et al.

(10) Patent No.: US 11,142,330 B2
(45) Date of Patent: Oct. 12, 2021

(54) MECHANICALLY-DISTRIBUTED PROPULSION DRIVETRAIN AND ARCHITECTURE

(71) Applicant: Aurora Flight Sciences Corporation, Manassas, VA (US)

(72) Inventors: Gary Richard Papas, Manassas, VA (US); Neil Titchener, Manassas, VA (US); Brian M. Yutko, Manassas, VA (US); Clint Church, Manassas, VA (US); Jian Long Tian, Manassas, VA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 373 days.

(21) Appl. No.: 16/117,305

(22) Filed: Aug. 30, 2018

(65) Prior Publication Data
US 2020/0070995 A1 Mar. 5, 2020

(51) Int. Cl.
*B64D 35/00* (2006.01)
*B64D 27/14* (2006.01)
(Continued)

(52) U.S. Cl.
CPC ............. *B64D 35/00* (2013.01); *B64C 1/16* (2013.01); *B64C 21/00* (2013.01); *B64C 21/06* (2013.01);
(Continued)

(58) Field of Classification Search
CPC ........ B64D 27/10; B64D 27/14; B64D 35/00; B64D 35/02; F02K 3/062
See application file for complete search history.

(56) References Cited

U.S. PATENT DOCUMENTS 2,704,434 A * 3/1955 Schmitt .................... F02K 3/12
    60/761
3,054,577 A    9/1962 Wolf et al.
(Continued)

FOREIGN PATENT DOCUMENTS

DE    102008024463 A1    12/2009
EP        3282117 A1      2/2018
(Continued)

OTHER PUBLICATIONS

Extended European search report in application No. EU 19192181.6, dated Jan. 23, 2020.
(Continued)

*Primary Examiner* — Joseph W Sanderson
(74) *Attorney, Agent, or Firm* — Michael Stanley Tomsa; McAndrews, Held & Malloy, Ltd.; Eugene H. Nahm

(57) ABSTRACT

An aircraft with an integrated boundary layer ingesting propulsion having a mechanically-distributed propulsion system. The mechanically-distributed propulsion system may include an engine to generate a mechanical drive power, a drive shaft, a direction-reversing transmission, and a propulsor fan. The drive shaft may be operatively coupled to the engine to receive the mechanical drive power. The direction-reversing transmission may have a first rotating shaft and a second rotating shaft, the first rotating shaft operatively coupled to the drive shaft to receive the mechanical drive power, which is configured to redirect the mechanical drive power received at the first rotating shaft from a first direction to face a second direction at the second rotating shaft. The propulsor fan may be coupled to the second rotating shaft to convert the mechanical drive power into thrust.

20 Claims, 20 Drawing Sheets

(51) Int. Cl.
  B64C 21/00    (2006.01)
  B64D 33/04    (2006.01)
  F16H 1/22     (2006.01)
  F16H 37/06    (2006.01)
  B64C 1/16     (2006.01)
  B64C 21/06    (2006.01)
  F02K 3/062    (2006.01)

(52) U.S. Cl.
  CPC ............ B64D 27/14 (2013.01); B64D 33/04 (2013.01); F02K 3/062 (2013.01); F16H 1/222 (2013.01); F16H 37/065 (2013.01)

(56) References Cited

U.S. PATENT DOCUMENTS

| | | | | |
|---|---|---|---|---|
| 3,262,659 | A * | 7/1966 | Copeland | B64D 35/00 244/207 |
| 3,485,462 | A * | 12/1969 | Spence | B64D 27/02 244/55 |
| 4,674,712 | A | 6/1987 | Whitener et al. | |
| 6,019,313 | A * | 2/2000 | Lenhart | B64D 35/00 244/17.19 |
| 6,279,852 | B1 * | 8/2001 | Dusserre-Telmon | B64D 27/14 244/60 |
| 6,834,833 | B2 | 12/2004 | Sankrithi | |
| 7,540,450 | B2 * | 6/2009 | Brand | B64D 27/14 244/54 |
| 8,438,829 | B2 * | 5/2013 | Negulescu | B64D 33/04 60/39.183 |
| 8,701,381 | B2 * | 4/2014 | Eames | B64D 27/14 60/39.163 |
| 9,701,395 | B2 * | 7/2017 | Veilleux, Jr. | B64D 35/06 |
| 9,719,465 | B2 * | 8/2017 | Suciu | F02K 1/605 |
| 10,247,108 | B2 * | 4/2019 | Curlier | F01D 5/02 |
| 10,267,263 | B2 * | 4/2019 | Lord | B64D 33/02 |
| 10,352,274 | B2 * | 7/2019 | Suciu | F02C 3/10 |
| 10,421,554 | B2 * | 9/2019 | Suciu | B64D 27/14 |
| 10,428,740 | B2 * | 10/2019 | Suciu | B64D 27/14 |
| 2009/0029607 | A1 * | 1/2009 | Ryugo | B63H 23/06 440/75 |
| 2010/0212285 | A1 * | 8/2010 | Negulescu | B64D 27/14 60/226.1 |
| 2012/0128487 | A1 * | 5/2012 | Eames | F01D 15/10 416/1 |
| 2014/0250862 | A1 | 9/2014 | Suciu et al. | |
| 2015/0284071 | A1 * | 10/2015 | Veilleux, Jr. | B64D 35/08 244/62 |
| 2016/0017844 | A1 * | 1/2016 | Suciu | F02K 1/60 244/53 B |
| 2016/0102634 | A1 | 4/2016 | Suciu et al. | |
| 2017/0096232 | A1 | 4/2017 | Suciu et al. | |
| 2017/0240286 | A1 * | 8/2017 | Lemarchand | B64C 3/182 |
| 2018/0038315 | A1 * | 2/2018 | Lord | B64D 33/04 |
| 2018/0051654 | A1 * | 2/2018 | Suciu | F02C 7/36 |
| 2018/0163633 | A1 * | 6/2018 | Suciu | F02C 7/36 |
| 2018/0163664 | A1 * | 6/2018 | Suciu | B64D 35/04 |
| 2018/0266316 | A1 * | 9/2018 | Soulat | F02C 3/107 |
| 2018/0283272 | A1 * | 10/2018 | Curlier | F02K 3/062 |
| 2018/0340493 | A1 * | 11/2018 | Cazals | B64D 29/00 |
| 2018/0355749 | A1 * | 12/2018 | Sheridan | F01D 13/003 |
| 2019/0084683 | A1 * | 3/2019 | Schwoller | B64D 33/02 |

FOREIGN PATENT DOCUMENTS

| | | |
|---|---|---|
| EP | 3284942 A1 | 2/2018 |
| RU | 168859 U1 | 2/2017 |
| WO | WO2014/193515 | 12/2014 |
| WO | 2017/060629 A1 | 4/2017 |

OTHER PUBLICATIONS

Notification of the Positive Result of the Formal Examination of the Invention, dated Oct. 10, 2019, in Russian Application No. 2019117202/11(032890).

"A Reversed, Tilted Future for Pratt's Geared Turbofan?," Aviation Week, downloaded from http://aviationweek.com/technology/reversedtiltedfutureprattsgearedturbofan on Sep. 6, 2016.

Dr. Ruben Del Rosario, "NASA Aeronautics Advanced Air Transport Technology, Applied Modeling & Simulation (AMS) Seminar Series," NASA Ames Research Center, May 21, 2015.

"D8 Ultra-Efficient Commercial Aircraft," Aurora Flight Sciences brochure, Oct. 2015.

Drela, Mark, "Development of the D8 Transport Configuration," 29th AIAA Applied Aerodynamics Conference, Jun. 30, 2011.

Mark Phelps, "D8 'Ultra-Efficient Commercial Aircraft' Forges Ahead," Jul. 22, 2016.

NASA N+3 MIT Team Final Review, NASA Langley Research Center, Apr. 23, 2010.

Drela, Mark, "Development of the D8 Transport Configuration," 29th AIAA Applied Aerodynamics Conference (Paper 2011-3970), Jun. 30, 2011.

Uranga, Alejandra, "Preliminary Experimental Assessment of the Boundary Layer Ingestion Benefit for the D8 Aircraft," 52nd Aerospace Sciences Meeting (Paper 2014-0906), Jan. 13-17, 2014.

Greitzer, E.M., "N+3 Aircraft Concept Designs and Trade Studies, Final Report," NASA/CR—2010-216794/vol. 1 (Dec. 2010).

Official Action (Inquiry) dated Mar. 8, 2020 in Russian Application No. 2019117202/11(032890) and translation (13 pages).

* cited by examiner

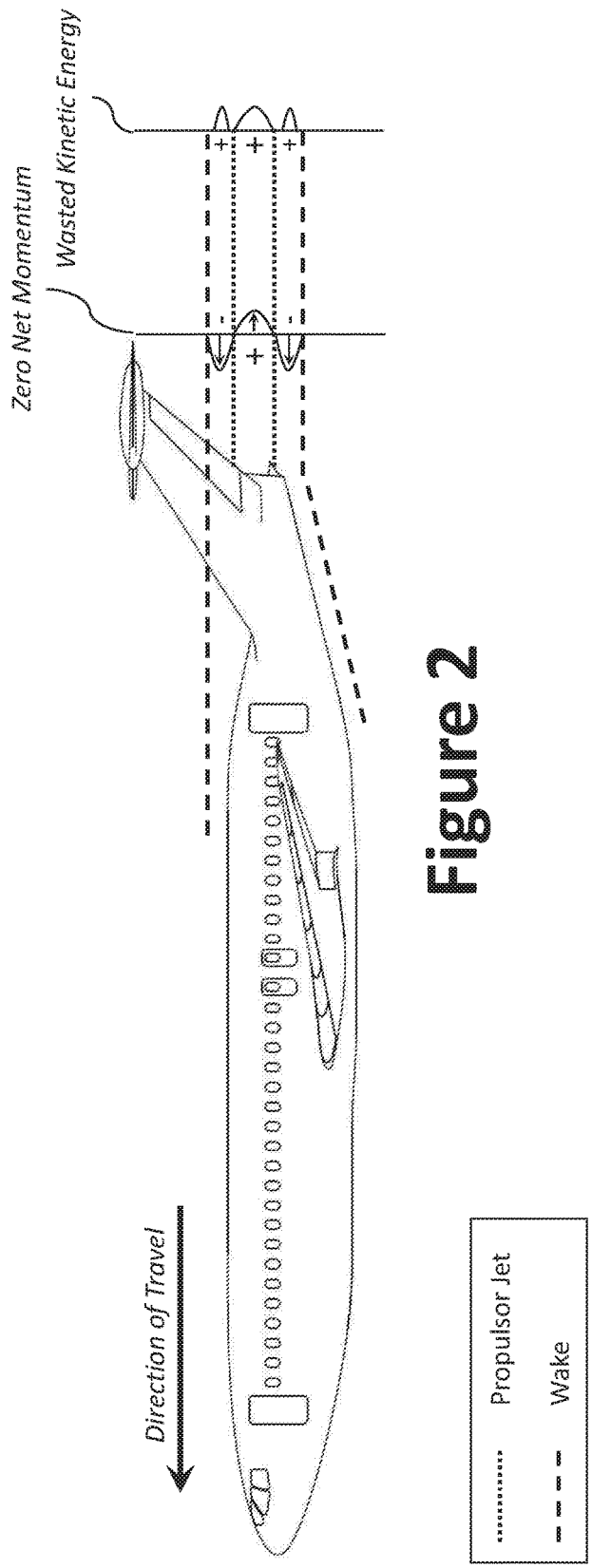
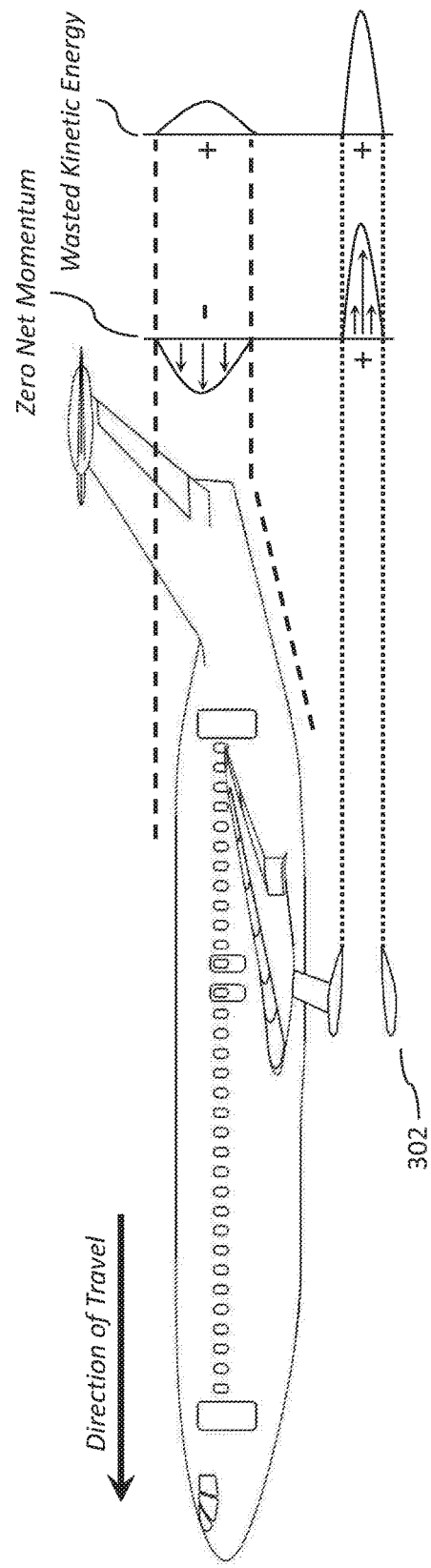

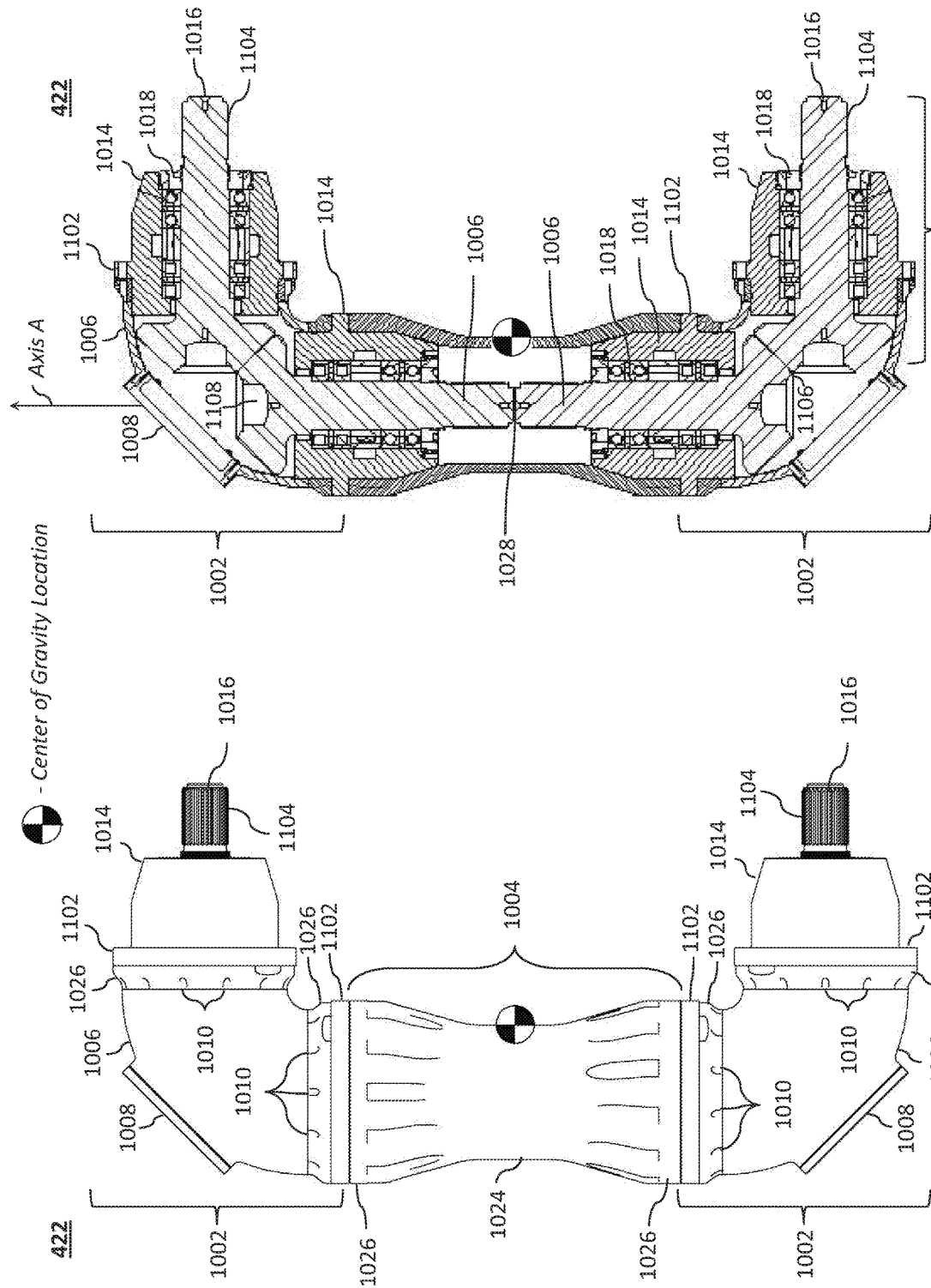

MECHANICALLY-DISTRIBUTED PROPULSION DRIVETRAIN AND ARCHITECTURE

STATEMENT OF GOVERNMENT INTEREST

This invention was made with government support under Contract Number: NND15AC56C awarded by the National Aeronautics and Space Administration (NASA). The government has certain rights in the disclosure.

FIELD

The present disclosure relates to the field of increased-efficiency aircraft; more particularly, to an aircraft with a mechanically-distributed propulsion drivetrain and architecture.

BACKGROUND

There is a strong economic desire to improve the fuel efficiency of commercial aircraft. The basic aircraft platform, however, has not changed since the dawn of the commercial jet age. The dominant commercial aircraft configuration—a tube-and-wing configuration—is a highly optimized and mature platform from which it is becoming increasingly difficult to extract further fuel efficiency improvements. By way of illustration, while there has been a small decrease in wing sweep due to improved aerodynamics, the silhouettes of a tube and wing aircraft from the 1960s through today show considerable similarity. For decades, engineers have evaluated and optimized the subsystems and components of the tube-and-wing configuration for efficiency and safety. For example, the engine configurations have progressed from turbojets, to turbofans, to high-bypass-ratio turbofans with a bypass ratio of approximately 8.0, to geared turbofans that offer a higher bypass ratio of up to 12.0. The benefits of this mature platform are countered by the difficulty of improving the platform. That is, performance increases are becoming more difficult to achieve. Improvements in engine efficiency, for example, are slow and reaching towards the theoretical limitations of turbofan engines. Aircraft efficiency improvements of approximately 1.5% per year (measured in terms of kg per seat) are being paced by a combination of propulsion, aerodynamic, and structural efficiency improvements that will continue to mature over time.

In order to provide economic benefit to airlines and consumers at a faster rate, a new configuration can be used. Throughout the commercial jet age, various reconfigurations have been proposed for aircraft, however such reconfigurations were not viable in the existing air transportation infrastructure or were too radical for development. Further, those in the field argue that advancements in propulsion systems alone cannot continue to be the primary change agent. For example, a continuation of the current design practices will result in increased nacelle drag, increased propulsor weight, and under-wing installation challenges due to large fans.

In view of the foregoing, a need exists for a novel fuel-efficient aircraft configuration that is compatible with a mature air transportation system. A high degree of integration between the propulsion system and the airframe may be a component of the substantial savings offered by future configurations. However, this integration introduces new challenges for engine and airframe manufacturers.

SUMMARY

The present disclosure is directed to an advanced fuel-efficient aircraft with an integrated propulsion system that enables ingestion of the aircraft boundary layer. For example, a fuselage may be provided that improves aircraft fuel efficiency by integrating a propulsion system into the fuselage in a way that enables ingestion of the aircraft boundary layer to provide a fuel efficiency benefit. In another example, a new mechanically-distributed propulsion drivetrain and architecture may be provided to continue improving aircraft fuel efficiency.

According to a first aspect, a mechanically-distributed propulsion system for use in an aircraft comprises: an engine to generate a mechanical drive power; a drive shaft operatively coupled to the engine to receive the mechanical drive power; a direction-reversing transmission having a first rotating shaft and a second rotating shaft, the first rotating shaft operatively coupled to the drive shaft to receive the mechanical drive power, wherein the direction-reversing transmission is configured to redirect the mechanical drive power received at the first rotating shaft from a first direction to face a second direction at the second rotating shaft; and a propulsor fan coupled to the second rotating shaft to convert the mechanical drive power into thrust.

In certain aspects, the direction-reversing transmission comprises a first angled drive assembly to turn a path of the mechanical drive power by a first angle, and a second angled drive assembly to turn the path of the mechanical drive power by a second angle.

In certain aspects, each of the first angle and the second angle are equal.

In certain aspects, each of the first angle and the second angle is a right angle.

In certain aspects, the first angled drive assembly and the second angled drive assembly are mechanically coupled to one another via a linear drive shaft assembly.

In certain aspects, the first angled drive assembly comprises the first rotating shaft having a first axis of rotation and a third rotating shaft having a third axis of rotation, the first rotating shaft and the third rotating shaft being mechanically coupled to one another via a first set of bevel gears, wherein the first axis of rotation and the third axis of rotation are positioned relative to one another at the first angle.

In certain aspects, the second angled drive assembly comprises the second rotating shaft having a second axis of rotation and a fourth rotating shaft having a fourth axis of rotation, the second rotating shaft and the fourth rotating shaft being mechanically coupled to one another via a second set of bevel gears, wherein the second axis of rotation and the fourth axis of rotation are positioned relative to one another at the second angle.

In certain aspects, the third rotating shaft and the fourth rotating shaft are mechanically coupled to one another.

In certain aspects, the third rotating shaft and the fourth rotating shaft are mechanically coupled to one another via a sliding spline coupling.

In certain aspects, the direction-reversing transmission includes a conduit manifold and a plurality of fluid conduits to supply lubricant to the direction-reversing transmission.

In certain aspects, the propulsor fan is positioned on the aircraft to ingest a boundary layer flowing over a fuselage of the aircraft.

In certain aspects, the propulsor fan is blended with the fuselage.

In certain aspects, the propulsor fan is blended with the fuselage via a set of integral nacelle cowling diffusers defined by the fuselage.

In certain aspects, the propulsor fan is integrated with an aft-fuselage subassembly of the fuselage.

In certain aspects, the fuselage includes a center fuselage subassembly having a non-circular cross-section.

In certain aspects, the fuselage includes a center fuselage subassembly having a double-bubble cross-section.

In certain aspects, the aft-fuselage subassembly is fabricated as a semi-monocoque structure having a plurality of fuselage-skin pieces fastened to an internal structure, which may be fabricated using a composite material.

In certain aspects, the mechanically-distributed propulsion system is configured in a forward orientation where the engine is configured to expel exhaust aft.

In certain aspects, the mechanically-distributed propulsion system is configured in a reverse orientation where the engine is configured to expel exhaust forward.

In certain aspects, the engine is coupled to a rear-facing engine exhaust to redirect the exhaust aft.

In certain aspects, the propulsor fan is positioned separate and apart from the engine.

In certain aspects, the propulsor fan is integrated with the fuselage and the engine is positioned within the fuselage and forward of the propulsor fan.

According to a second aspect, an aerial vehicle comprises: a fuselage; a wing set operatively coupled to said fuselage; an empennage at the aft end of said fuselage, the empennage having a plurality of flight control surfaces; a propulsor fan integrated at an aft end of said fuselage, the aft end of said fuselage being shaped with a geometry to direct a boundary layer flowing over the fuselage to the propulsor fan; an engine positioned within the fuselage to generate a mechanical drive power; and a direction-reversing transmission to receive the mechanical drive power from the engine and to redirect the mechanical drive power from a first direction to face a second direction.

In certain aspects, the first direction is opposite the second direction.

In certain aspects, the first direction is from a forward end and the second direction is toward the forward end.

In certain aspects, the fuselage includes a center fuselage subassembly having a non-circular cross-section.

In certain aspects, the fuselage includes a center fuselage subassembly having a double-bubble cross-section.

According to a third aspect, a method of operating an aircraft having a mechanically-distributed propulsion system comprises: generating a mechanical drive power using an engine; receiving the mechanical drive power from the engine via a drive shaft; receiving the mechanical drive power from the drive shaft via a direction-reversing transmission, wherein the direction-reversing transmission comprises a first rotating shaft and a second rotating shaft, the first rotating shaft being operatively coupled to the drive shaft; redirecting the mechanical drive power received at the first rotating shaft from a first direction to face a second direction at the second rotating shaft; and rotating a propulsor fan to convert the mechanical drive power into thrust, wherein the propulsor fan is operatively coupled to the second rotating shaft.

DRAWINGS

These and other advantages of the present disclosure may be readily understood with the reference to the following specifications and attached drawings wherein:

FIGS. 2 and 3 illustrate a comparison of the wake and jet of integrated engines vis-à-vis outboard engines.

FIGS. 10a through 10f illustrate external and cross-sectional views of example direction-reversing transmissions.

DESCRIPTION

Figure 1A:
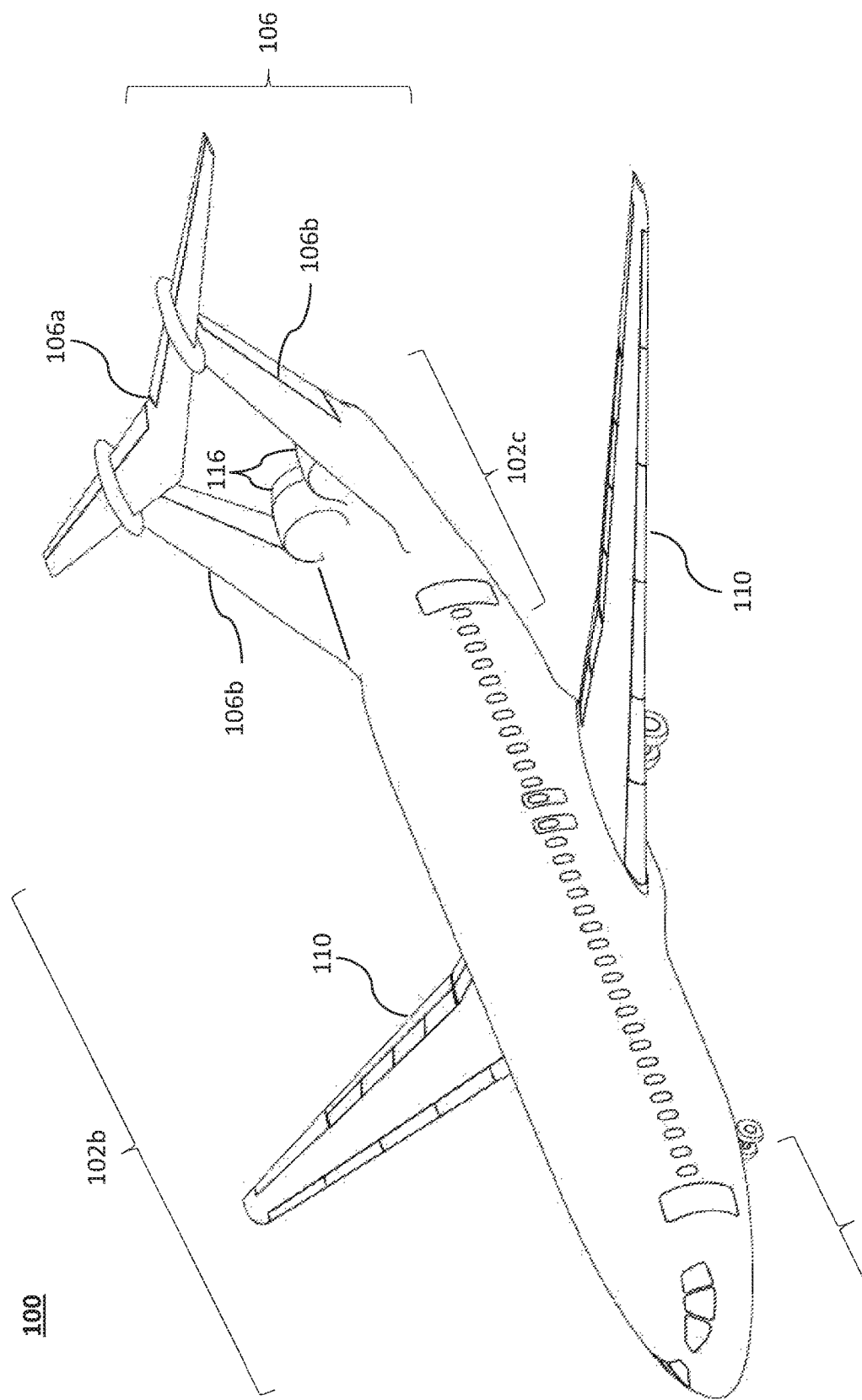
FIG. 1a illustrates an isometric view of an example aircraft in accordance with an aspect of the present disclosure.

Preferred embodiments of the present disclosure may be described hereinbelow with reference to the accompanying drawings. In the following description, well-known functions or constructions are not described in detail because they may obscure the disclosure in unnecessary detail. In the following description, it is understood that terms such as "first," "second," "top," "bottom," "side," "front," "back," and the like are words of convenience and are not to be construed as limiting terms. Further, the use of any and all examples, or exemplary language ("e.g.," "such as," or the like) provided herein, is intended merely to better illuminate the embodiments and does not pose a limitation on the scope of the embodiments. No language in the specification should be construed as indicating any unclaimed element as essential to the practice of the embodiments. For this disclosure, the following terms and definitions shall apply.

The terms "about" and "approximately," when used to modify or describe a value (or range of values), mean reasonably close to that value or range of values. Thus, the embodiments described herein are not limited to only the recited values and ranges of values, but rather should include reasonably workable deviations.

The terms "aerial vehicle" and "aircraft" refer to a machine capable of flight, including, but not limited to, run-way aircraft and vertical take-off and landing (VTOL) aircraft.

The term "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

The term "composite material" refers to a material comprising an additive material and a matrix material. For example, a composite material may comprise a fibrous additive material (e.g., fiberglass, glass fiber ("GF"), carbon fiber ("CF"), aramid/para-aramid synthetic fibers, FML, etc.) and a matrix material (e.g., epoxies, polyimides, aluminum, titanium, and alumina, including, without limitation, plastic resin, polyester resin, polycarbonate resin, casting resin, polymer resin, thermoplastic, acrylic resin, chemical resin, and dry resin). Further, composite materials may comprise specific fibers embedded in the matrix material, while hybrid composite materials may be achieved via the addition of some complementary materials (e.g., two or more fiber materials) to the basic fiber/epoxy matrix.

Disclosed herein is an aircraft that provides improved efficiency over existing jet airliners through, inter alia, boundary layer ingestion (BLI) via a rear-mounted integrated (i.e., blended to the fuselage) propulsion system having a mechanically-distributed propulsion system architecture. The aircraft disclosed herein may fly missions comparable to existing short-range to medium-range, narrow-body jet airliners (e.g., the Boeing 737-800). To that end, the aircraft may be designed to operate using engines comparable to the Boeing 737-800 and, if desired, manufacture using existing materials, while also greatly reducing environmental impact. That is, compared to existing short-range to medium-range, narrow-body (or wide-body) aircraft, the disclosed aircraft is capable of a 71% reduction in fuel burn, a reduction in noise (e.g., a 60 effective perceived noise level in decibels (EPNdB)), and an 87% reduction in low-temperature oxidation (LTO) NOx.

The efficiency gains are the result of a tightly integrated design approach, considering the aircraft as a single, integrated system rather than an assembly of individual parts. First, employing a rear-mounted integrated propulsion system reduces thrust requirements, which means that smaller engines can be used to reduce weight and fuel consumption.

Second, the rear-mounted integrated propulsion system may employ a mechanically-distributed propulsion system architecture, which offers a number of benefits. For example, a mechanically-distributed propulsion system architecture exhibits more favorable compliance with uncontained engine rotor failure (UERF) 1:20 regulation by staggering high speed spools in multiple-engine components for reduced lateral impact risk, as well as a more favorable aircraft weight and balance by moving engine center of gravity forward (or backward, as the case may be). Further, a mechanically-distributed propulsion system architecture allows for optimizing BLI fan and inlet without consideration for the engine, while also allowing for low fan pressure ratios (FPR) through closely integrated propulsors and for noise benefit due to fan and engine shielding. As a result, engine accessibility is improved, while reducing fan nacelle wetted area and weight. In fact, a mechanically-distributed propulsion system architecture requires minimal modifications to existing engine core architectures because modification can be limited to the driveline.

Finally, the cross-section of the fuselage of the aircraft may be non-circular; for example, the fuselage may be a double-bubble fuselage, an oval fuselage, or another fuselage with a non-circular cross section. Indeed, increased lift generated by a wide non-circular fuselage means smaller wings are needed to carry the weight if the aircraft, resulting in less fuel needed to fly a given mission. Where an oval fuselage is desired, for example, a substantially rectangular section may be positioned between two clipped circular, or semi-circular, sections. While the aircraft will be generally illustrated as a double-bubble aircraft, the cross-section of the fuselage may be another non-circular shape.

Figure 1B:
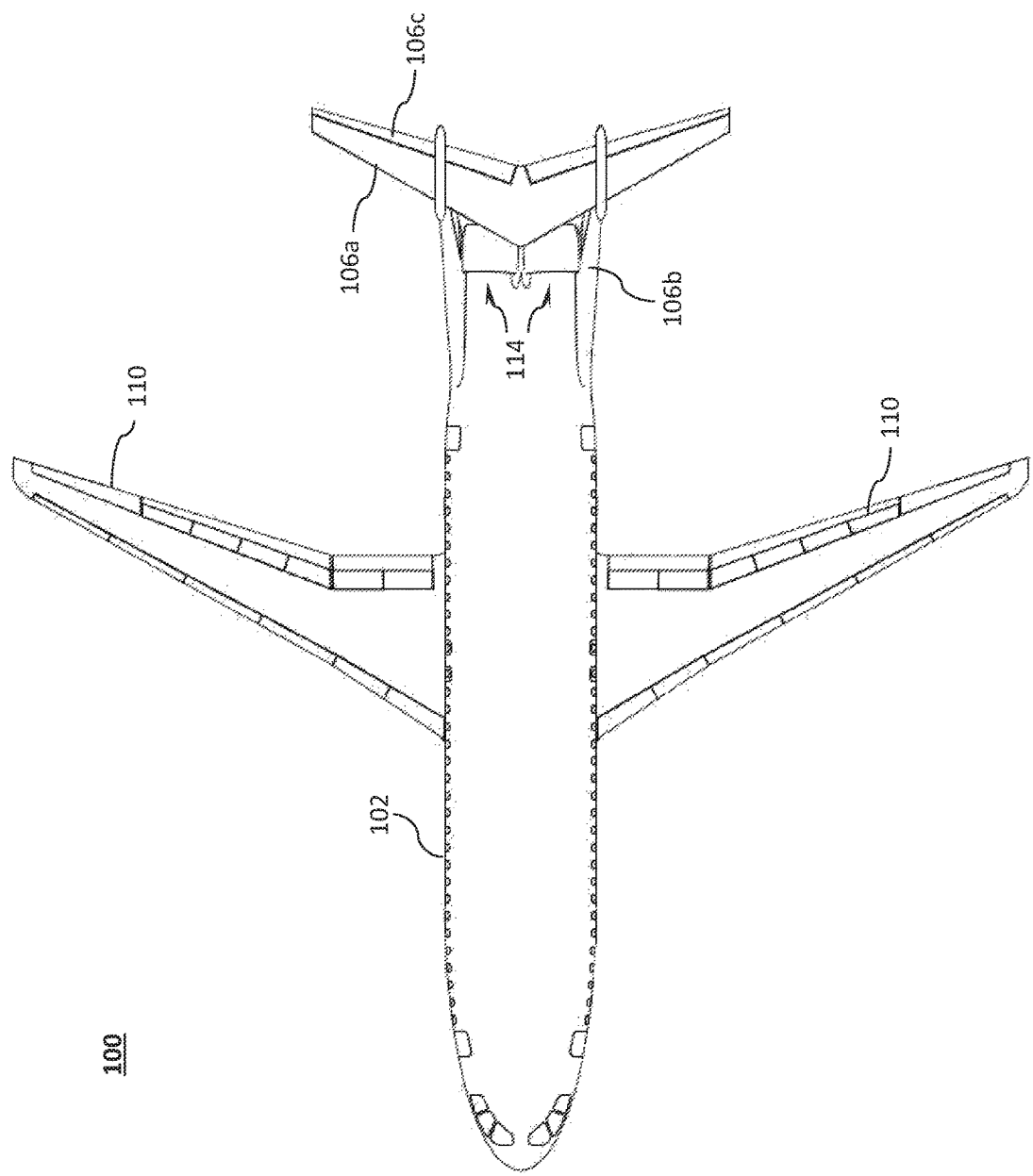
FIG. 1b illustrates a top plan view of the example aircraft.
Figure 1C:
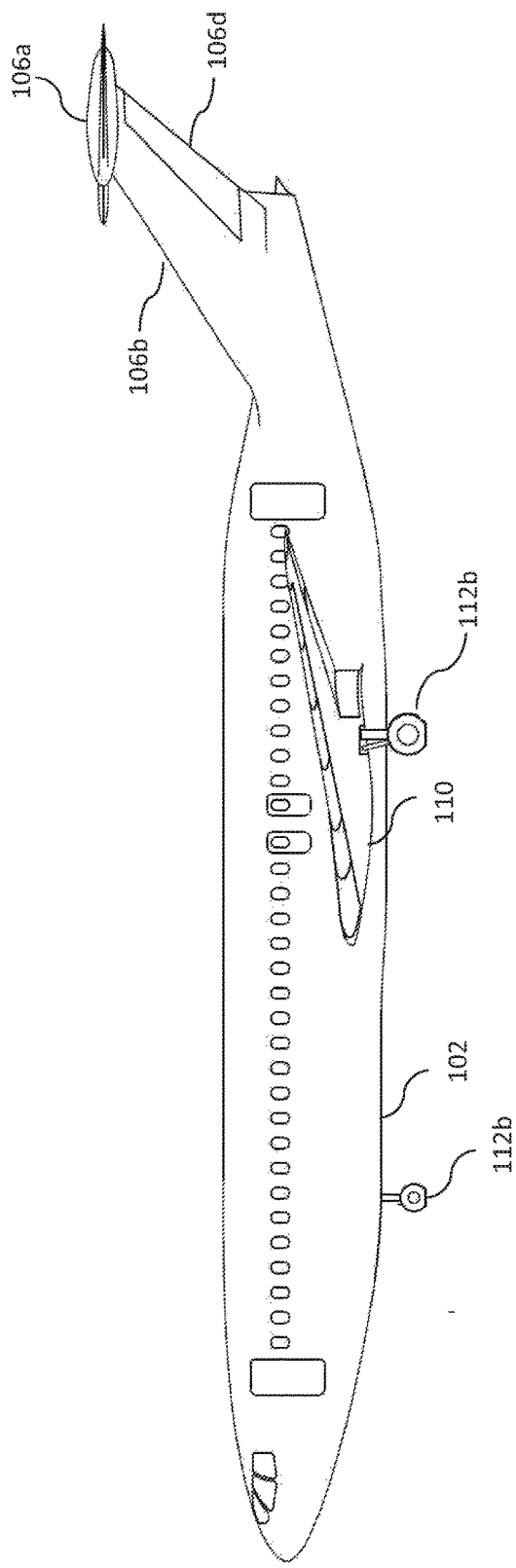
FIG. 1c illustrates a side view of the example aircraft.
Figure 1D:
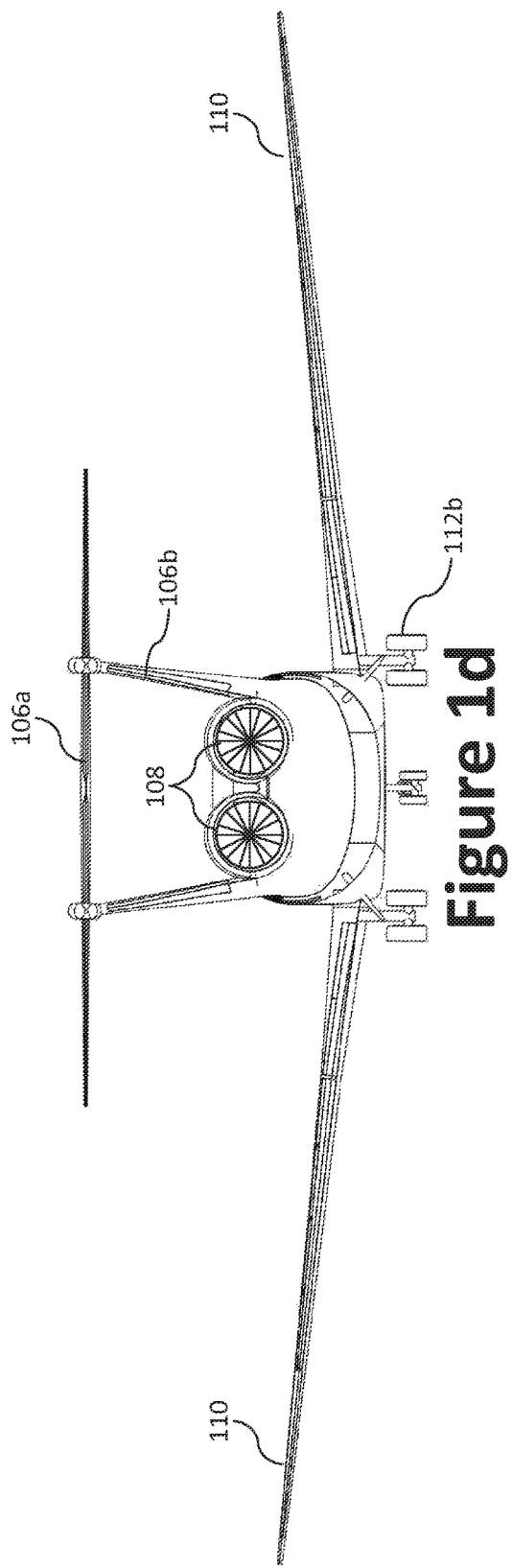
FIG. 1d illustrates a rear view of the example aircraft.

FIGS. 1a through 1h illustrate an example aircraft 100 according to an aspect of the present disclosure. Specifically, FIG. 1a illustrates an isometric view of the aircraft 100, while FIG. 1b illustrates a top plan view thereof. FIG. 1c illustrates a side view of the aircraft 100 and FIG. 1d illustrates a rear view thereof. FIGS. 1e through 1h illustrate, respectively, top, side, rear, isometric views of the aft end of the aircraft 100 with an empennage 106. In accordance with an aspect of the present disclosure, the aircraft 100 may a fixed-wing aircraft with a wingspan of about 70 to 270 feet, more preferably about 90 to 140 feet, most preferably about 118 feet. The length of the aircraft 100 may be about 90 to 250 feet, more preferably about 90 to 140 feet, most preferably about 115 feet. As one of skill in the art would appreciate, however, the aircraft 100 can be scaled up (or down) to facilitate a particular purpose based on, for example, a given mission (i.e., flight objective and/or flight plan).

While the aircraft 100 is generally described herein as being manned (e.g., it contains a cockpit for a human operator), the cockpit may be omitted when the aircraft 100 is configured for unmanned and/or fully autonomous aircraft (i.e., requiring no pilot control). For example, the aircraft 100 may be controlled by an onboard autonomous autopilot or remotely controlled over a wireless communication link by a human operator, a computer operator (e.g., remote autopilot), or a base station. Contingent on the mission needs (e.g., maneuverability, range, and payload capacity), an unmanned variation of the aircraft 100 may be scaled down (e.g., by about 40 to 60%, or about 50%) relative to its manned counterpart as a function of mission needs (e.g., maneuverability, range, payload capacity, etc.).

As illustrated, the aircraft 100 generally comprises a fuselage 102, two primary wings 110, an empennage 106, and an integrated propulsion system to generate the thrust necessary for flight. As will be discussed, the integrated propulsion system may employ a mechanically-distributed propulsion system architecture design where a set of integrated propulsor fans 108 (illustrated as ducted fans) is positioned at the aft end of the fuselage 102 (e.g., within a set of integral nacelle cowling diffusers 116) and an engine 414 is positioned elsewhere within the fuselage 102. The engine 414 may be coupled with the propulsor fans 108 via a driveline or drivetrain, which may be configured in either a forward orientation or a reverse orientation.

The aircraft 100 may further include landing gear 112 (e.g., nose-end landing gear 112a and main landing gear 112b), one or more fuel tanks, an avionics bay, a payload bay, a heat exchanger (e.g., an air-cooled oil cooler with a fan), two or more forward-facing fan inlets 114 to supply air (e.g., from the boundary layer over the fuselage 102) to the propulsor fans 108, thereby facilitating the BLI. Each propulsor fan 108 may be, for example, 12 to 60 inches in diameter, more preferable, 24 to 48 inches, most preferably, about 38 inches. Each propulsor fan 108 may employ, for example, 10 to 30 blades, more preferably, 15 to 25 blades, most preferably about 18 to 20 blades, with ~1.45 FPR (~1.35 non-BLI equivalent).

The fuselage 102 may be segmented with one or more longitudinal, central structural elements (e.g., a tension web) running longitudinally along the length of the fuselage 102. For example, the fuselage 102 may generally comprise a forward fuselage subassembly 102a, a center fuselage subassembly 102b, and an aft-fuselage subassembly 102c, where the forward, center, and aft-fuselage subassemblies 102a, 102b, 102c are fabricated separately and joined via the one or more longitudinal structural components. The forward fuselage subassembly 102a generally comprises the cockpit, while the center fuselage subassembly 102b generally defines the payload section (e.g., for cargo and/or passengers), as the case may be. The aft-fuselage subassembly 102c defines the tail section (e.g., the empennage 106) and includes, inter alia, the integral nacelle cowling diffusers 116 to house the propulsor fans 108 or another propulsion device. The aft-fuselage subassembly 102c may be integral with, or coupled to, the empennage 106.

The cross-section of the fuselage 102 may be non-circular and, in certain aspects, may employ a double-bubble fuselage where its cross-section resembles two "bubbles" or lobes protruding from each side of a longitudinal, central structural element, which can run the length of the fuselage 102 (e.g., from its nose to tail). For example, the cross-section of the center fuselage subassembly 102b of the aircraft 100 may generally define two side-by-side cylindrical lobes joined at the center of the cross section with either a cusped or parallel intersection with a structural element (i.e., central structural element) located at the lobe joints (thus formation of a "Y-joint") on the top and bottom of the fuselage 102 to yield a substantially elliptic outer mold line fuselage 102 cross section. Each lobe may be, for example, a semi-sphere, oval, or the like.

A non-circular fuselage 102, in addition to facilitating BLI of the integrated propulsion system, can provide significant improvements in environmental performance and efficiency. For example, replacing the traditional tube (i.e., a circular cross-section) with the non-circular fuselage 102: (1) increases fuselage carryover lift, which shrinks and lightens the exposed wing area; (2) provides a nose-up trimming moment, which shrinks the horizontal tail and further shrinks the wing; (3) moves side-of-body load transfer points farther apart, giving a partial span-loading and weight reduction; (4) offers a landing gear with a shorter load path into the side-of-body, resulting in lighter landing gear support structure; (5) allows for shorter landing gear struts due to its shorter tail; (6) provides fewer windows due to shorter cabin/fuselage 102, thus reducing weight; (7) reduces floor beam weight by using a floor center support (e.g., central structural element); and (8) accommodates a twin-fin "Pi-tail" or "n-tail" configuration, which lightens the horizontal tail, and accommodates integral nacelle cowling diffusers 116 for installation of propulsors toward the aft end. The symmetric vertical stabilizers 106b may attach to a tail support structure 408 that is aligned to the tail spar angle. The symmetric vertical stabilizers 106b may be arranged in as a slight V, as illustrated in FIG. 1d.

Figure 1E:
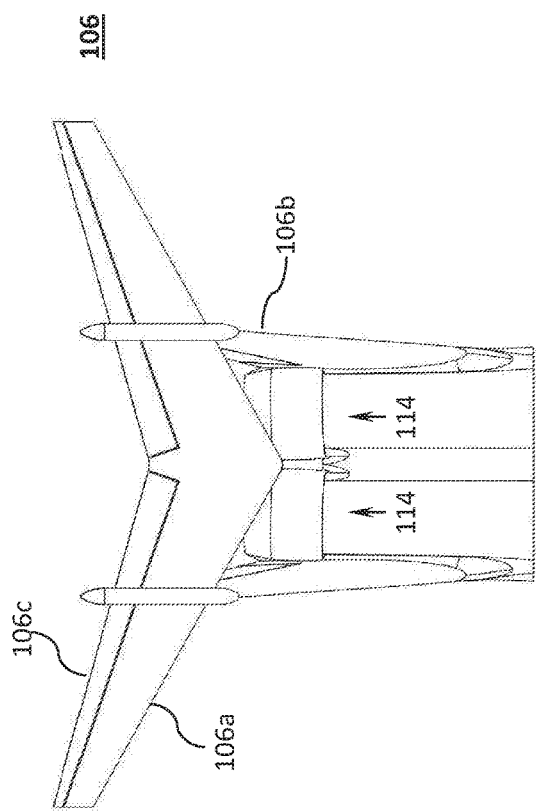
FIGS. 1e through 1g illustrate, respectively, top plan, side, and rear views of the aft end of the example aircraft.
Figure 1G:
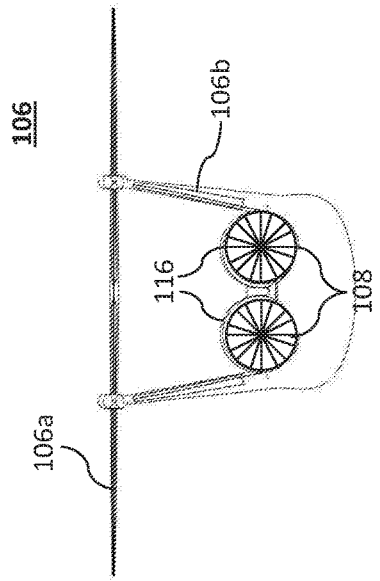
Figure 1F:
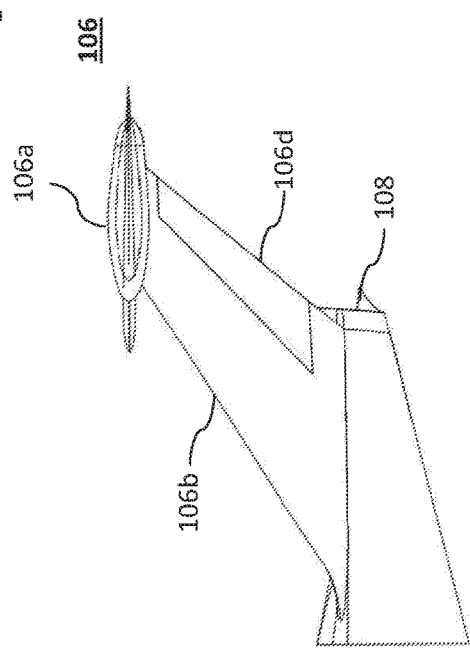

FIGS. 1e through 1g illustrate the general arrangement of the aft-fuselage subassembly 102c and empennage 106. The aft-fuselage subassembly 102c may be a semi-monocoque structure with two or three major aircraft skin pieces (e.g., panels) fastened and adhered around the internal structure. A monocoque structure refers to a structure in which the chassis is integral with the body, while semi-monocoque refers to a stressed shell structure that is similar to a true monocoque, but derives at least some strength from conventional reinforcement. The empennage 106 generally comprises one or more horizontal stabilizers 106a and vertical stabilizers 106b. The empennage 106 may include redundant control surfaces with two split rudders 106d and at least two elevators 106c. The empennage 106 may be configured as one of multiple tail configurations, including, for example, fuselage mounted, a cruciform, T-tail, a flying tailplane, or, as illustrated in FIGS. 1a through 1h, a pi-tail (i.e., π-tail). The three aerodynamic surfaces of the illustrated empennage 106 (i.e., the two symmetric vertical stabilizers 106b and the horizontal stabilizer 106a) may be fabricated using composite assemblies with core-stiffened skins. The aerodynamic surfaces of the empennage 106 have primary lift spars and smaller aft spars through which they are attached to each other and the fuselage 102 in structurally determinant three point attachments with two locations on the main spar and the third on the aft spar. Example techniques for attachment of the vertical stabilizer 106b to the aft-fuselage subassembly 102c include: a spade-type spar extension that protrudes into the fuselage that has canted, mating offset bulkheads; and a "knuckle"-type multi-lugged fitting arrangement located at the surface intersection of the two bodies. While a V-shaped horizontal stabilizer 106a is illustrated, other shapes are contemplated, including straight horizontal stabilizers. The symmetric vertical stabilizers 106b may attach to a tail support structure that is aligned to the tail spar angle. The symmetric vertical stabilizers 106b may be arranged as a slight V, as illustrated in FIG. 1d.

The nose-end landing gear 112a and main landing gear 112b systems of the aircraft 100 may employ air and/or oil type landing gear struts to absorb shock during taxiing and landing. In certain aspects, the shock absorption capability of the main landing gear 112b may be enhanced through trailing-link enhancements. For example, the main landing gear 112b may include a trailing-link suspension with one or more links connected between, and perpendicular to and forward of, the axle and a pivot point. The nose-end landing gear 112a steering system may employ an electromechanical actuator, commanded by the triplex flight computer (or other control system) of the aircraft 100, driving the hydraulically boosted nose-end landing gear 112a steering ram through a spool valve to obtain the required steering angle. Steering angle feedback may be produced through a rotary potentiometer. An accumulator may be used to provide adequate pressure and flow during high bandwidth operations at low engine speeds. The nose-end landing gear 112a may be, for example, capable of steering angles of 60 to 90 degrees (e.g., 75 degrees) left and right. The nose-end landing gear 112a and main landing gear 112b may be retracted and extended through an electrically controlled, hydraulically actuated system using the onboard hydraulic power. The brake system of the aircraft 100 may also be electrically controlled and hydraulically actuated. Control may be accomplished through, for example, the triplex flight control unit to an electromechanical actuator operating a hydraulic metering valve. Feedback may be accomplished through left and right brake system pressure sensors to the triplex flight control unit. Hydraulic pressure may be generated from the engine driven hydraulic system and a backup braking system is accomplished through use of a pneumatic emergency pressure supply directly to the brake calipers through use of a shuttle valve.

Figure 1H:
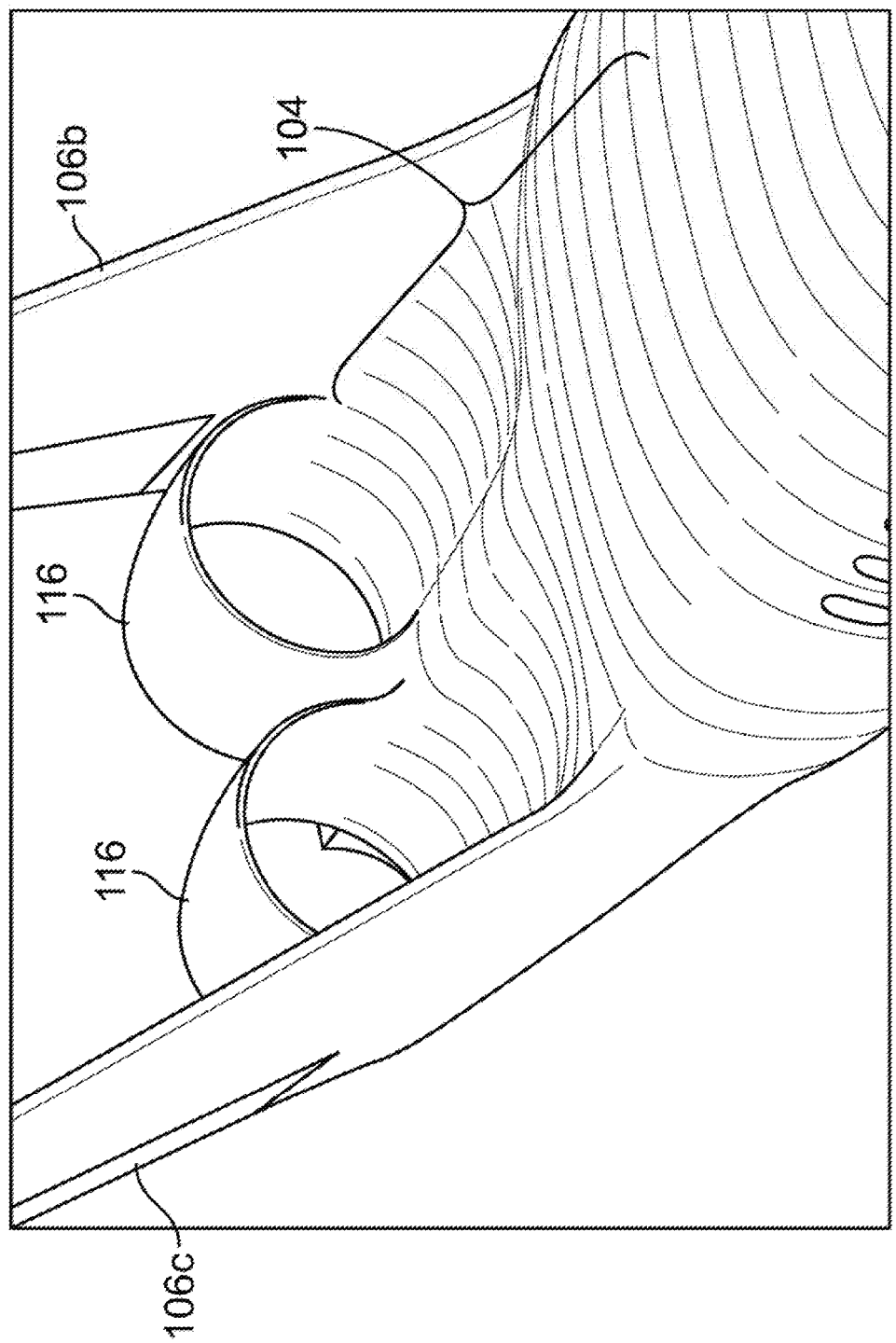
FIG. 1h illustrates an empennage section of example aircraft and the complex geometric features near the inlets to the propulsors.

The airframe structure of the aircraft 100, including the fuselage 102, wings 110, and empennage 106, may be fabricated using one or more metals, metal alloys, or composite structures, which can include composite laminates. For example, a plurality of metals, metal alloys, or composite structures may be assembled and joined through a co-curing process, a co-bonding process, or a mechanical attachment (e.g., using metal fittings, which may be fabricated using aluminum, titanium, lightweight alloys, etc.). While the aircraft 100 (e.g., the fuselage 102) may be fabricated from aircraft grade metal alloy, composite materials offer certain advantages over metals when fabricating structures with complex geometries. In connection with the BLI feature, for example, the aft-fuselage subassembly 102c may employ complex geometries to direct the boundary layer from the center fuselage subassembly 102b to the fan inlets 114 of the propulsor fans 108. FIG. 1h illustrates an isometric view of the aft-fuselage subassembly 102c, which provides a complex geometry 104 to interface the top surface of the center fuselage subassembly 102b with the integral nacelle cowling diffuser 116. Accordingly, a molded composite laminate may be shaped to conform with and provide a continuous structural mass to follow the contour of a complex geometry without the mass penalty or load concentrations of lapped or multiple joined metal components. With regard to the aircraft 100, as an example, the aft-fuselage subassembly 102c provides a complex geometry to interface the upper surface of the center fuselage subassembly 102b with the integral nacelle cowling diffuser(s) 116, thereby directing the boundary layer from the center fuselage subassembly 102b to the forward-facing fan inlets 114 associated with the propulsor fans 108. Therefore, a composite structure may be more appropriate for the aft-fuselage subassembly 102c and any other structures having a complex geometry 104. To maximize producibility and performance, the fuselage skin may be co-cured with other components of the fuselage 102, such as the stringers.

Figure 12:
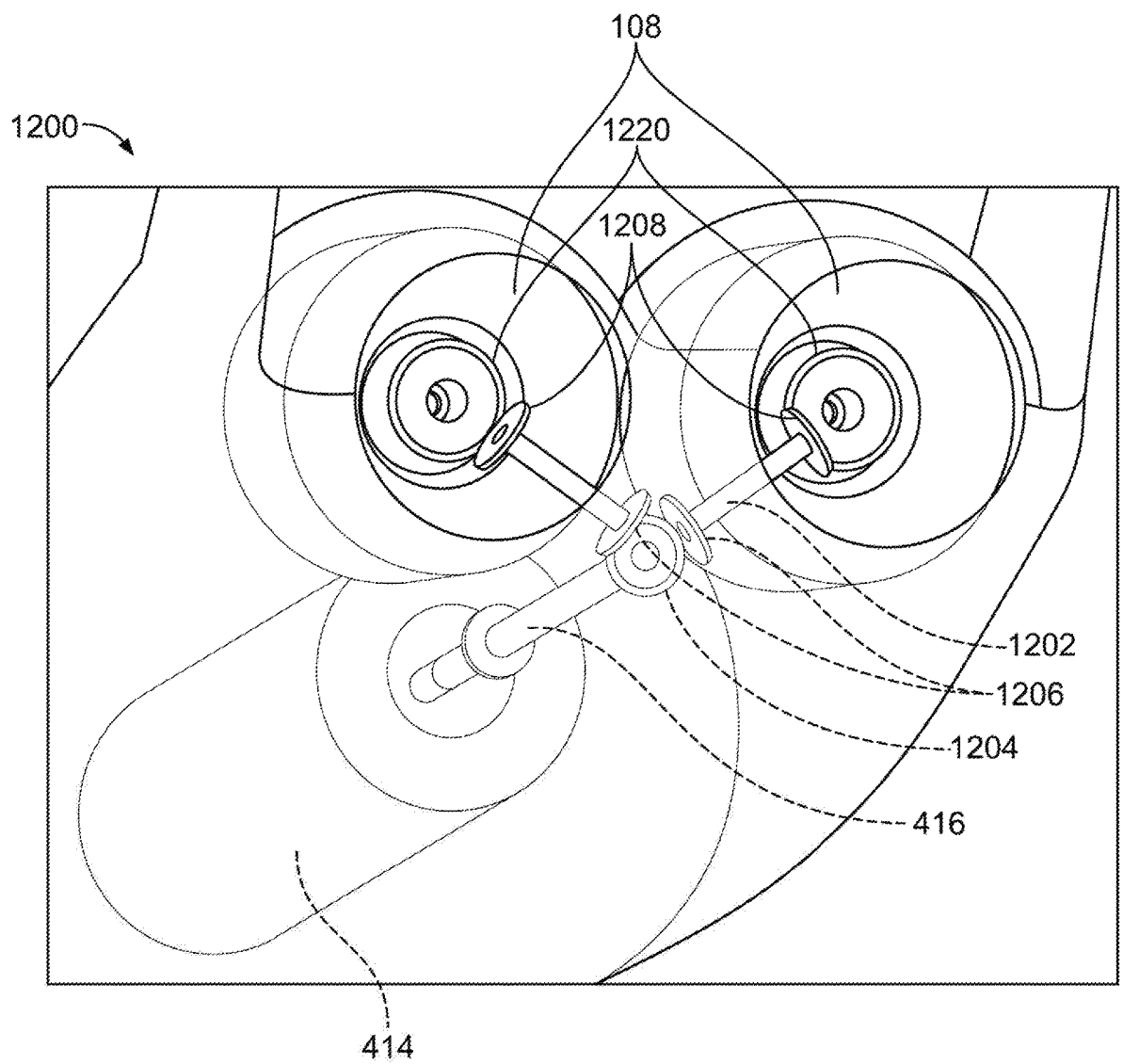
FIG. 12 illustrates an example configuration where a single engine is configured to drive multiple propulsor fans via a single drive shaft.

While the aircraft 100 will be generally described with a mechanically-distributed propulsion system architecture having twin propulsor fans 108 with twin engines 414, other propulsion systems are contemplated, including off-the-shelf engines (or modified version thereof), a twin fan with a single engine (an example of which is illustrated in FIG. 12), a hybrid-electric variant, a podded variant with rear BLI propulsors, etc. For example, an example hybrid-electric system for powering the integrated propulsor fans 108 via electric motors is described in greater detail by commonly owned U.S. Patent Publication No. 2017/0203839 to Francesco Giannini et al., which was filed on Jan. 11, 2017 and is titled "Hybrid Propulsion Vertical Take-Off and Landing Aircraft."

Boundary Layer Ingestion (BLI) Propulsion. Boundary Layer Ingestion (BLI) offers significant improvements to aircraft performance by reducing fuel consumption through the re-energization of the boundary layer off the fuselage 102 via the propulsion system. As can be appreciated by those of skill in the art, the term boundary layer refers to the part of the airflow that travels adjacent the surface of the aircraft 100 (e.g., over the wing 110 or fuselage 102) where viscous forces distort the surrounding non-viscous flow. Achieving BLI, however, poses certain challenges because it introduces airflow distortion into the engine. To mitigate distortion, existing commercial transport aircraft are powered by large diameter turbofan engines, which typically have direct-drive or parallel coaxial drive fan integrated with the turbomachine elements.

The non-circular fuselage 102, in addition to reducing weight through a virtuous cycle of smaller aerodynamics surfaces and more favorable landing gear placement, provides a structurally integral nacelle cowling diffuser 116 to enable installation of propulsor fans 108 for BLI. Further, employing a composite material facilitates manufacture of complex geometry 104 at the fan inlets 114 with minimal mass. By way of example, two or more propulsor fans 108 may be integrated into the body flow field of the fuselage 102 between the vertical stabilizers 106b (e.g., of the pi-tail). The propulsor fans 108 of the aircraft 100 are configured to ingest a large portion of the boundary layer flowing over the fuselage 102. The propulsor fans 108, as opposed to traditional podded engines 302 (e.g., as illustrated in FIG. 3), are able to ingest the boundary layer over the fuselage 102 to improve propulsive efficiency and reduce drag. Moreover, the engine reaction loads are engineered to best use the rigidity of the empennage 106 to fuselage 102 joint and direct loading out to the fuselage skin. While two propulsor fans 108 are illustrated, one of skill in the art would appreciate that additional propulsor fans 108 (or even a single integrated propulsor fan 108) may be employed as a function of the thrust needs of a given aircraft and propulsor size(s).

To illustrate the benefits of BLI, FIGS. 2 and 3 illustrate, respectively, the wake and jet streams of integrated propulsor fans 108 vis-à-vis outboard engines. As illustrated in FIG. 2, the aircraft wake and the propulsion jet are combined when propulsor fans 108 are integrated into the fuselage 102, thereby leading to a reduction in the overall wasted kinetic energy and thus an improvement in propulsive efficiency. Indeed, wind tunnel testing demonstrates a direct aerodynamic benefit of BLI. Specifically, an aircraft 100 having an integrated propulsion system yields an aerodynamic benefit of about 8%, which was confirmed through multiple tunnel entries, Reynolds numbers, and flight conditions. When utilized on a fully-optimized aircraft platform, the 8% aerodynamic direct benefit can translate to a 15% system fuel benefit through a spiral reduction in weight, power required, etc.

Integrating the propulsor fans 108 into the rear of the fuselage 102, however: improves propulsive efficiency via fuselage BLI; provides flow alignment for engines, allowing minimal lightweight nacelles; greatly reduces the engine-out yaw moments; shrinks the vertical tail area and weight; provides noise shielding because propulsor fan faces are invisible from the ground; allows fin strakes to function as engine/tail mounting pylons; and provides additional acoustic shields. A drive design that disturbs that flow path reduces the effectiveness of the BLI. Therefore, an obstacle in designing an aircraft with BLI is elimination of all disturbances in airflow leading from the center fuselage subassembly 102b up to, and into, the propulsor fans 108. Another significant challenge is that the engine core must be moved away from airflow distortion into the engine/propulsor fan. Indeed, where larger engines are desired for their high-power, their density should be forward-located to mitigate weight/balance issues, which necessitates a mechanical linkage for connecting the output shaft power from the engines to the rear of the propulsion system (e.g., the propulsor fan 108).

Therefore, the disclosed rear-mounted integrated propulsion system can employ a mechanically-distributed propulsion system architecture to addresses the engine core location challenge and other challenges of an integrated BLI aircraft configuration. Specifically, in a mechanically-distributed propulsion system architecture, an engine 414 can be mechanically coupled to a remotely located propulsor fan 108 through a driveline, which may include one or more gearboxes for speed and directional change. The remotely-powered propulsor fan 108 can therefore be optimized for distortion tolerance without packaging consideration for the engine shape/mass. In other words, a mechanically-distributed propulsion system architecture enables the engine 414 to be located in a favorable installation area of the aircraft 100, while the propulsor fans 108 can be positioned to facilitate BLI. The favorable installation area may be determined as a function of UERF regulations, aircraft weight/balance considerations, airflow distortion, etc.

Figure 4A:
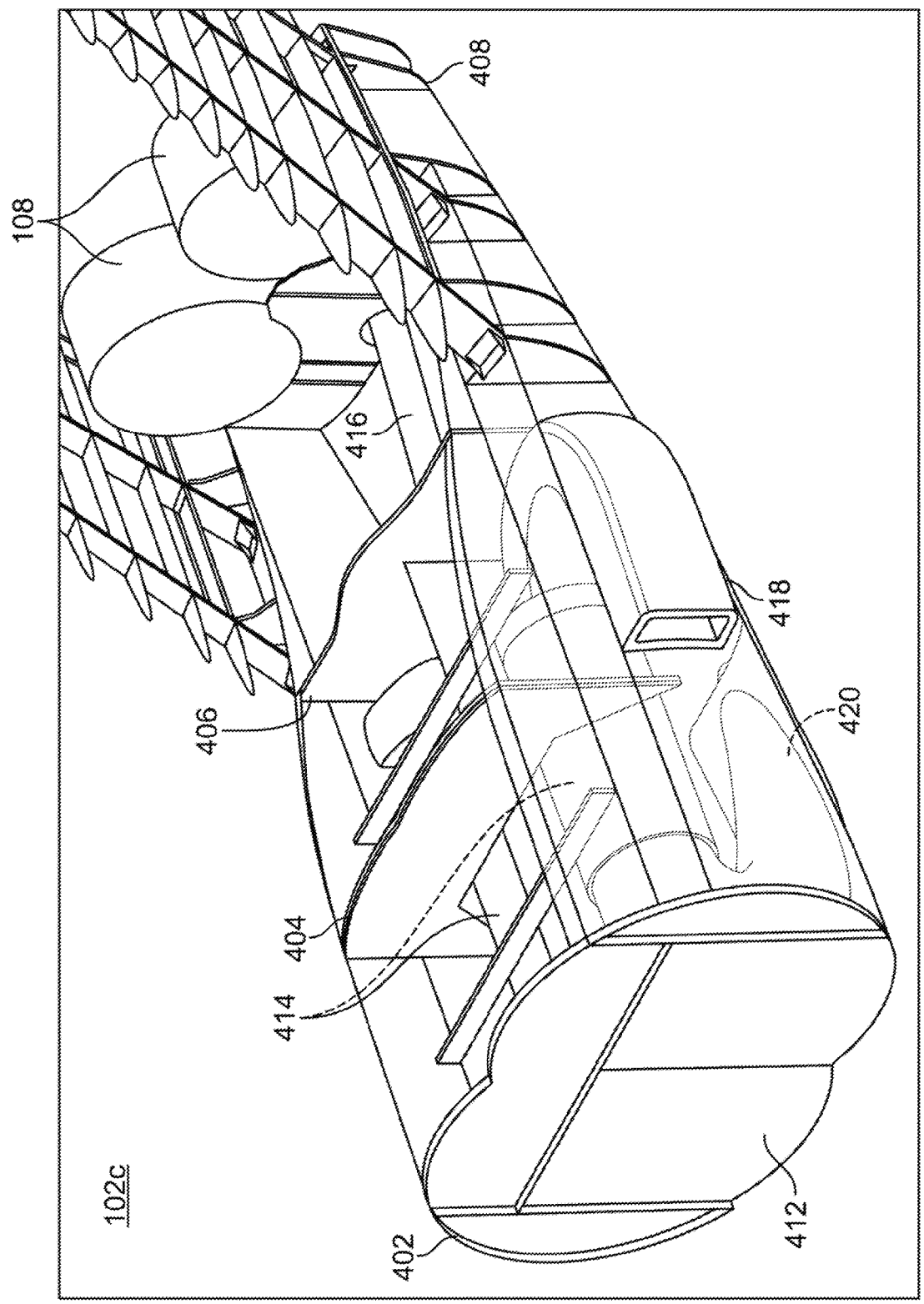
FIGS. 4a through 4d illustrate an aft-fuselage subassembly with a rear-mounted integrated propulsion system having a mechanically-distributed propulsion system architecture.
Figure 4B:
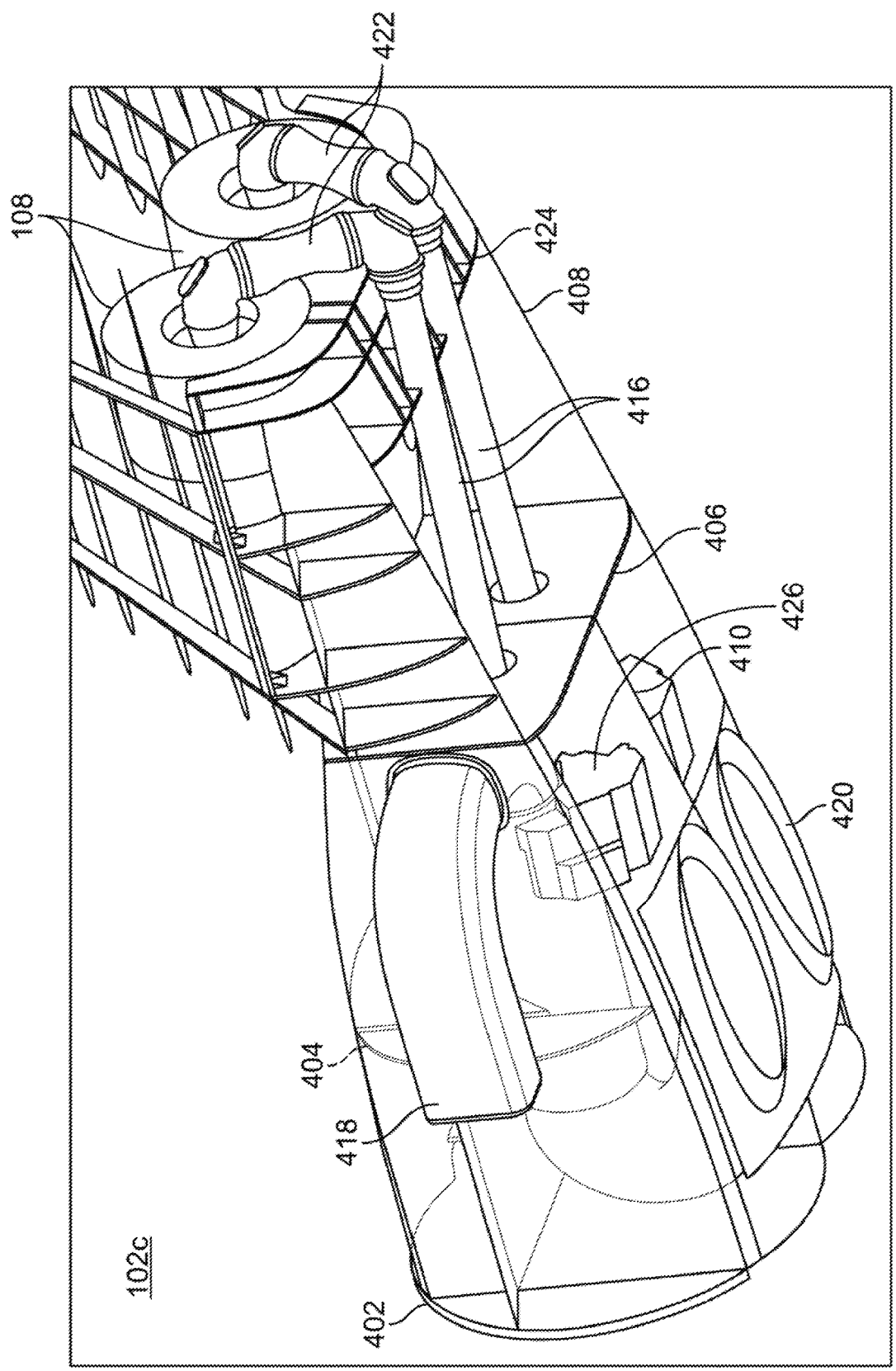
Figure 4C:
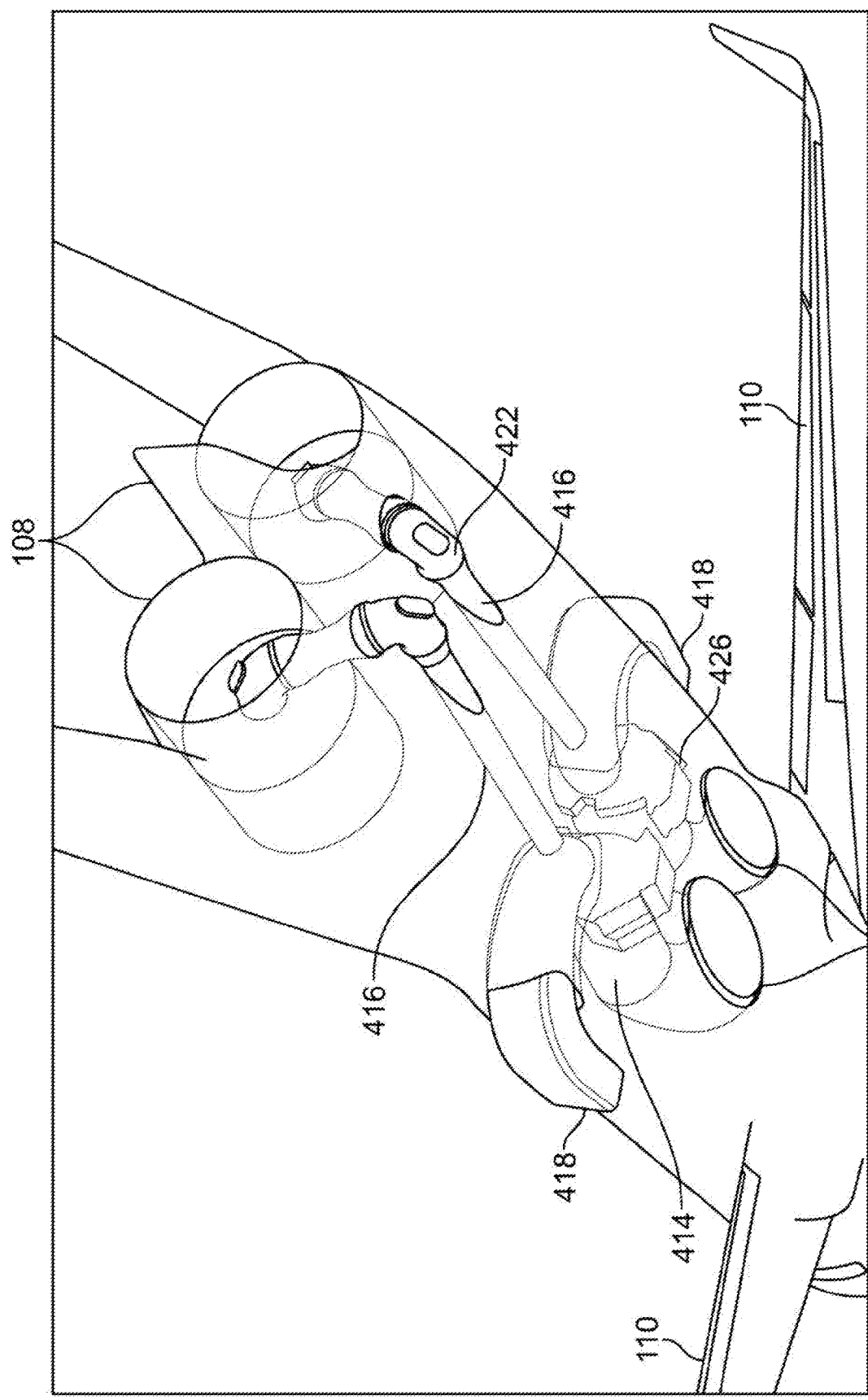

FIGS. 4a through 4d illustrate the aft-fuselage subassembly 102c with fuselage skin removed to better illustrate the rear-mounted integrated propulsion system having a mechanically-distributed propulsion system architecture. As illustrated, the aft-fuselage subassembly 102c may support the components of the rear-mounted integrated propulsion system via one or more bulkheads, such as a forward bulkhead 402, an intermediate bulkhead 404, an aft bulkhead 406, a tail support structure 408, and a fan support bulkhead 424, which may be integrated with the tail support structure 408. Each of the bulkheads may be fabricated from a composite material, where composite materials positioned in a fire zone (i.e., high heat zone) may include one or more layers of ceramic outer ply. The aft-fuselage subassembly 102c may further employ one or more firewalls to mitigate damage to the fuselage 102 that can be cause by heat (or fire) generated by the rear-mounted integrated propulsion system. For example, the forward bulkhead 402 may be shaped to house a detachable firewall 412, while a center firewall 410 may be positioned between the intermediate bulkhead 404 and the aft bulkhead 406 (as best illustrated in FIG. 4b). Each of the detachable firewall 412 and the center firewall 410 may be nonstructural (i.e., not load-bearing) and fabricated from, for example, titanium, titanium alloy, etc.

Figure 6A:
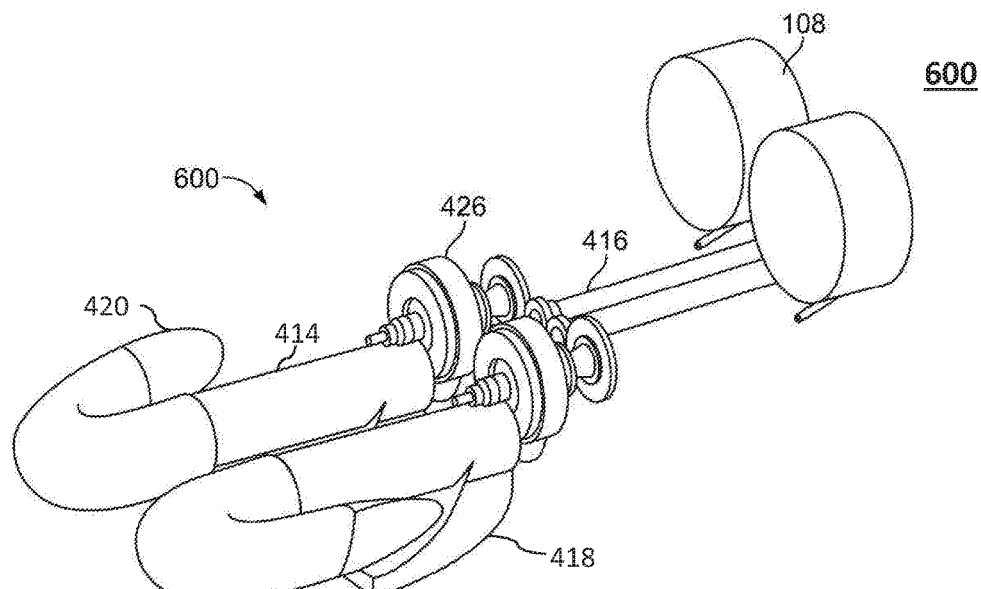
FIGS. 6a through 6c illustrate a rear-mounted integrated propulsion system in a reverse orientation.
Figure 7A:
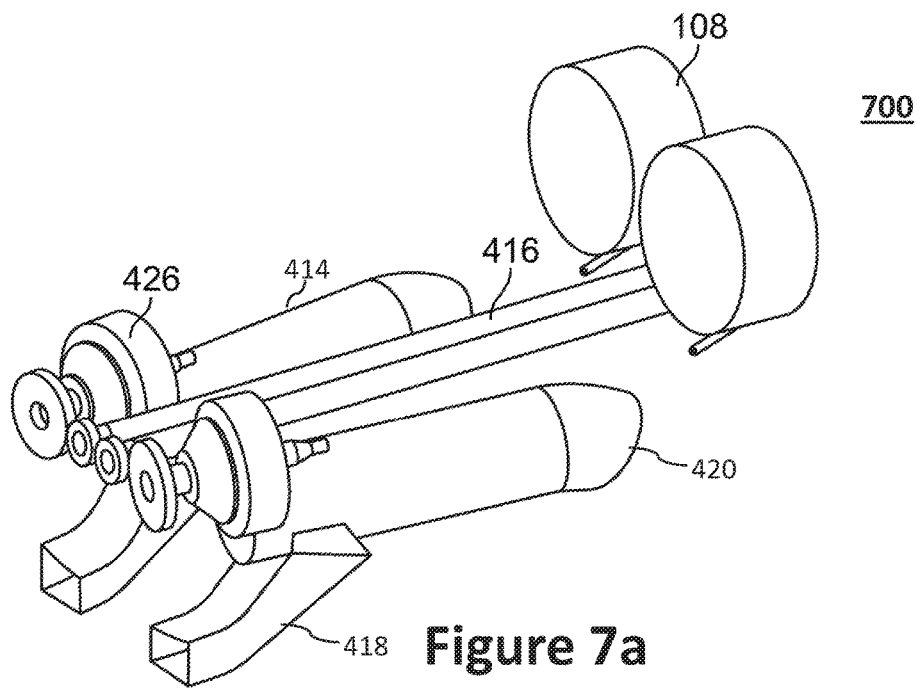
FIGS. 7a through 7c illustrate a rear-mounted integrated propulsion system in a forward orientation with centered drive shafts.
Figure 8A:
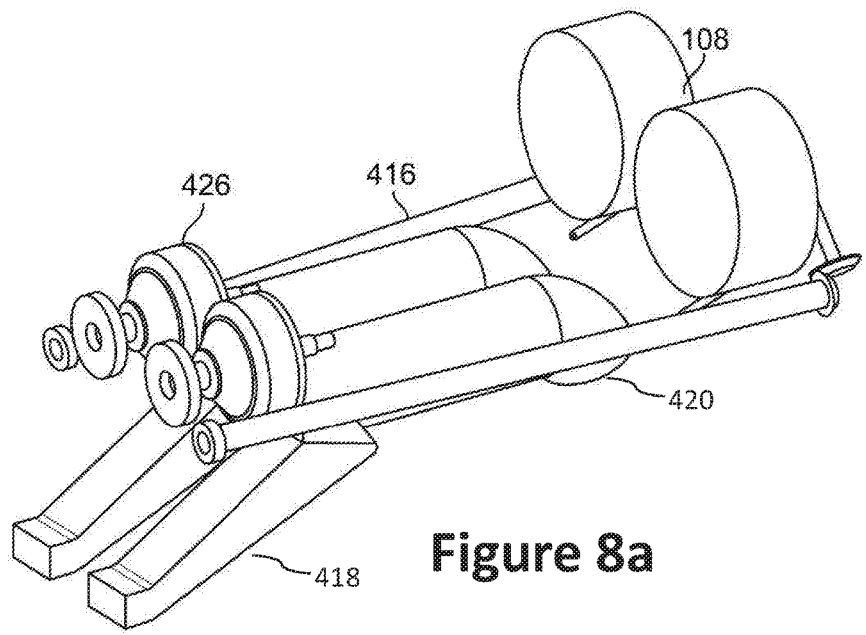
FIGS. 8a through 8c illustrate a rear-mounted integrated propulsion system in a forward orientation with outer drive shafts.

The rear-mounted integrated propulsion system generally comprises a set of propulsor fans 108 and a set of engines 414, each of the engines 414 being configured to drive (i.e., rotate) a propulsor fan 108 via a drive shaft 416 and a direction-reversing transmission 422. The driveline may further comprise one or more gearboxes 426 to provide speed (e.g., via an adjustable gearing ratio) and/or directional changes. The one or more gearboxes 426 may be provided in-line between the output from the engine 414 and the input to the direction-reversing transmission 422. For example, as best illustrated in FIGS. 6a, 7a, and 8a, a gearbox 426 may be position at the output of the engine 414, but before the drive shaft 416.

Figure 5A:
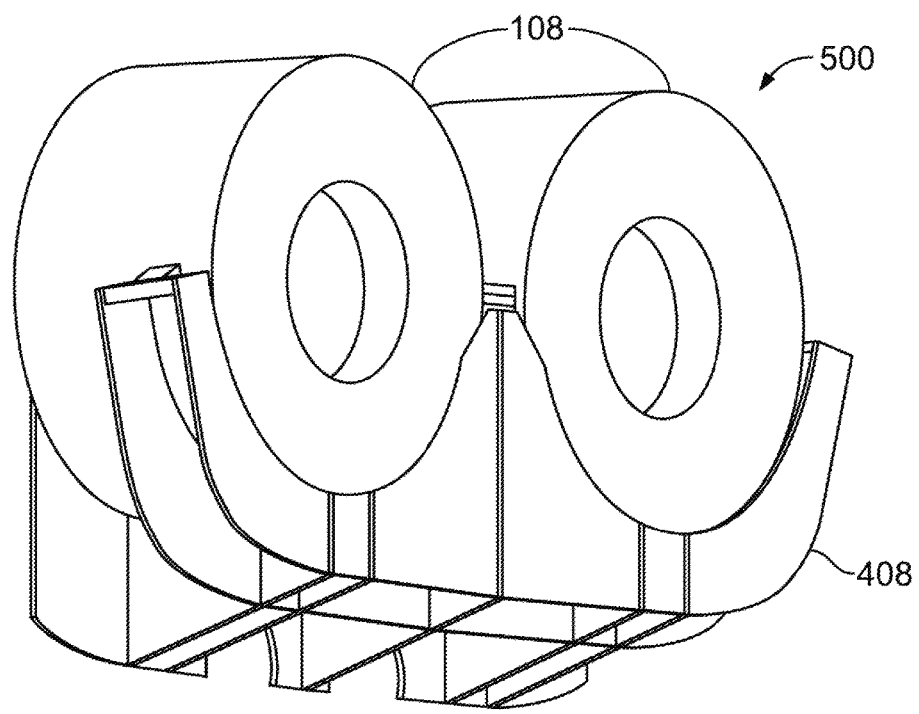
FIGS. 5a and 5b illustrate an example propulsor fan module.
Figure 5B:
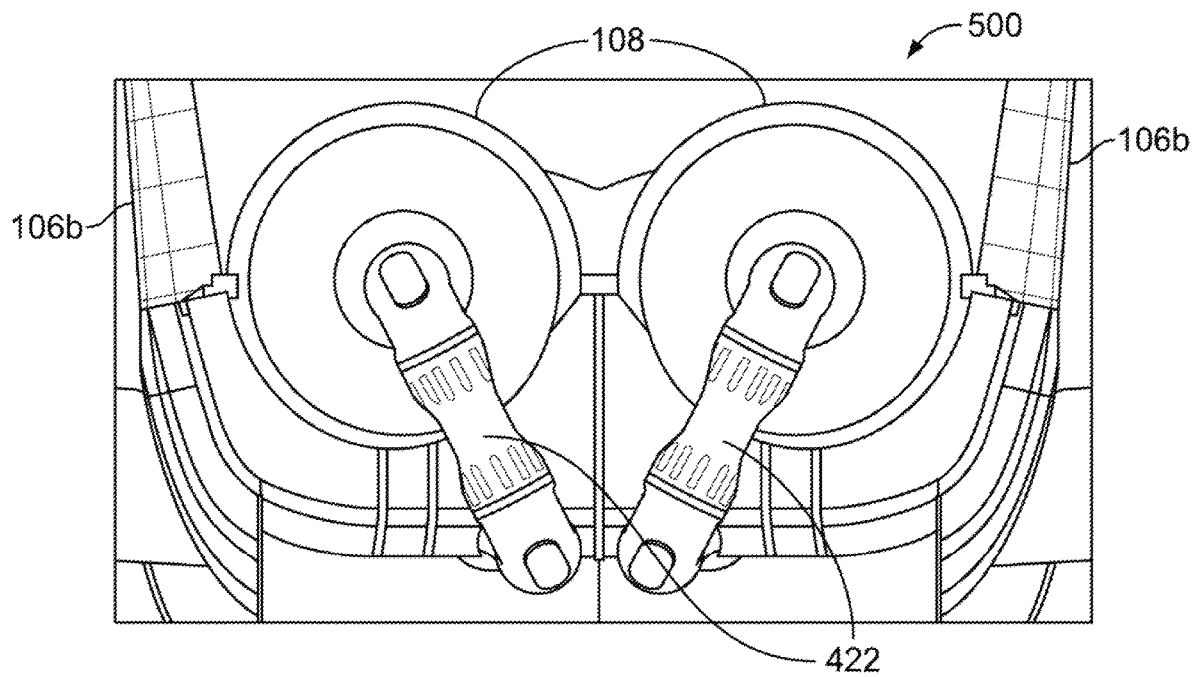

Each engine 414 may be, for example, a turboshaft engine (aka a turboshaft mechanical drive power generator), which is a form of gas turbine that is optimized to produce shaft power (i.e., mechanical drive power) rather than jet thrust. In one example, the engine 414 may be a 3.5 MW (5000 shp) class turboshaft, though the size may be selected as a function of design or performance requirements for the aircraft 100. The fan support bulkhead 424 and the set of propulsor fans 108 may be coupled to one another to define a propulsor fan module 500, as illustrated in FIG. 5a, which may be integrated into the aft-fuselage subassembly 102c as illustrated in FIG. 5b and mechanically coupled to the engines 414 via the set of direction-reversing transmissions 422 (and gearbox 426).

While the set of direction-reversing transmissions 422 are illustrated as exposed, they may be housed within a shielded fairing to improve aerodynamics of the aircraft 100, thereby reducing turbulence. The set of propulsor fans 108 may be positioned such that its flow field entrains a substantial portion of the boundary layer off the fuselage 102 (e.g., off the center fuselage subassembly 102b). The drive shafts 416 and other mechanical linkages of the driveline may be fabricated from, for example, metallic materials, composite materials, and/or other aerospace materials, such as brass, copper alloys, aluminum, steel, alloy steel, stainless steel, titanium, Kevlar, boron, epoxy composites, carbon fiber, and the like.

Figure 4D:
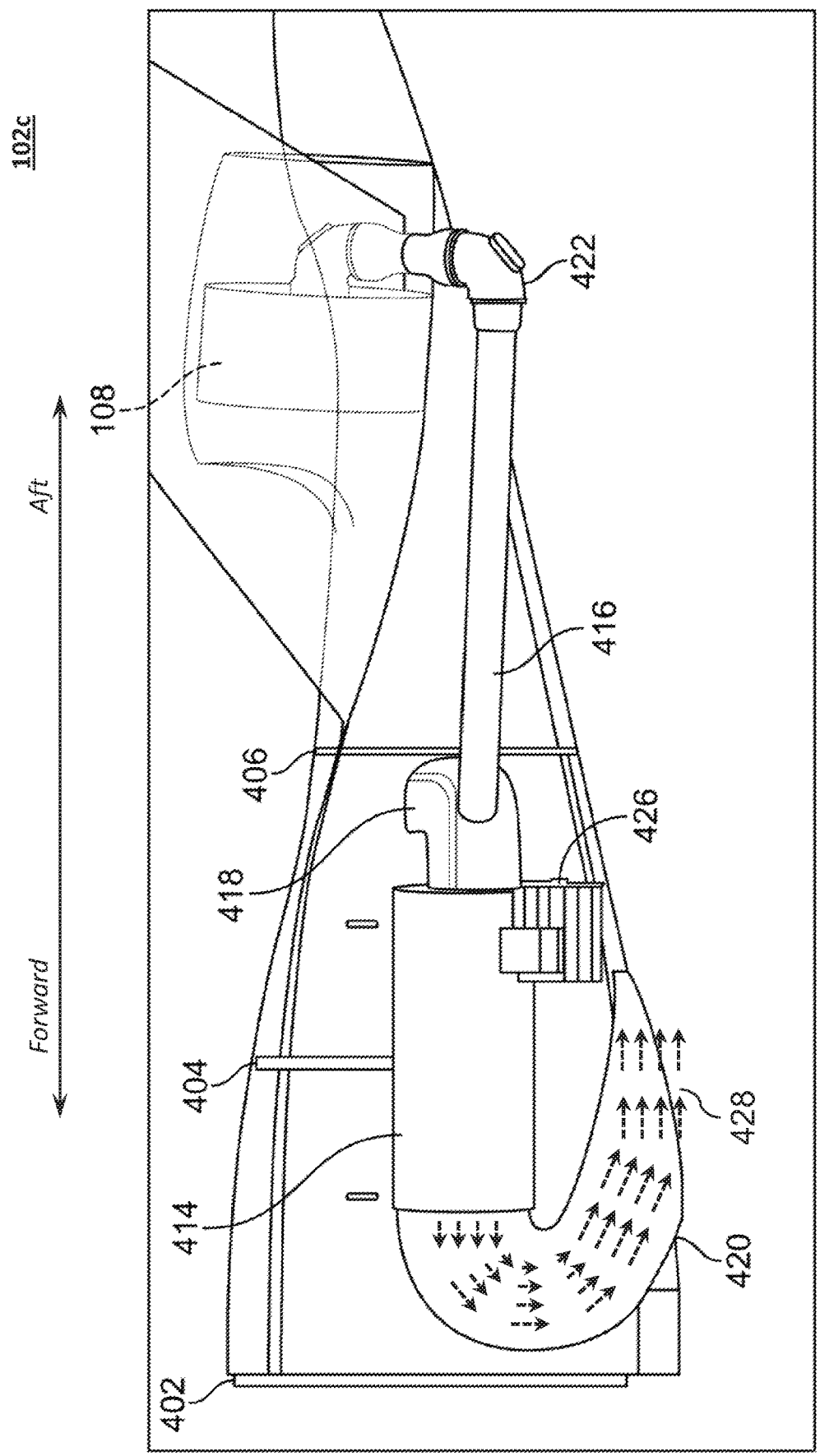

Each engine 414 is illustrated with a forward-facing engine inlet 418 to receive an airflow supply to the engine 414 and a rear-facing engine exhaust 420 to expel exhaust from the engine 414. As illustrated in FIG. 4d, the rear-mounted integrated propulsion system may be configured in a reverse orientation where the exhaust 428 from the engines 414 may be expelled from the engine 414 forward (e.g., toward the nose of the aircraft 100), then redirected aft toward the tail of the aircraft 100 and expelled via the rear-facing engine exhaust 420. While the forward-facing engine inlets 418 are illustrated in certain figures as positioned on the sides of the aft-fuselage subassembly 102c, the forward-facing engine inlet 418 may be positioned elsewhere on the aft-fuselage subassembly 102c, including, inter alia, the bottom surface of the aft-fuselage subassembly 102c. Likewise, while the rear-facing engine exhaust 420 is illustrated in certain figures as positioned on the bottom of the aft-fuselage subassembly 102c, the rear-facing engine exhaust 420 may be positioned elsewhere on the aft-fuselage subassembly 102c, including, inter alia, the sides or aft-most region (e.g., the rear tip) of the aft-fuselage subassembly 102c.

Each direction-reversing transmission 422 may be U-shaped such that a first end of the direction-reversing transmission 422 is configured to receive a mechanical drive power (e.g., torque and rotation force) from an engine 414 having a first axis of rotation via the drive shaft 416 and transfers the mechanical drive power through two right angle (i.e., 90 degree) couplings before outputting a mechanical drive power at a second end of the direction-reversing transmission 422 having a second axis of rotation that is parallel to the first axis of rotation, but pivoted by 180 degrees relative to the first axis of rotation.

As will be appreciated from the subject disclosure, another advantage of a mechanically-distributed propulsion system architecture is that the various components the rear-mounted integrated propulsion system may be rearranged to adapt to various aircraft configurations. For example, when desired, the rear-mounted integrated propulsion system may be rearranged to provide favorable aircraft weight and balance by moving the center of gravity of the engine 414 aft (i.e., backward).

Figure 6B:
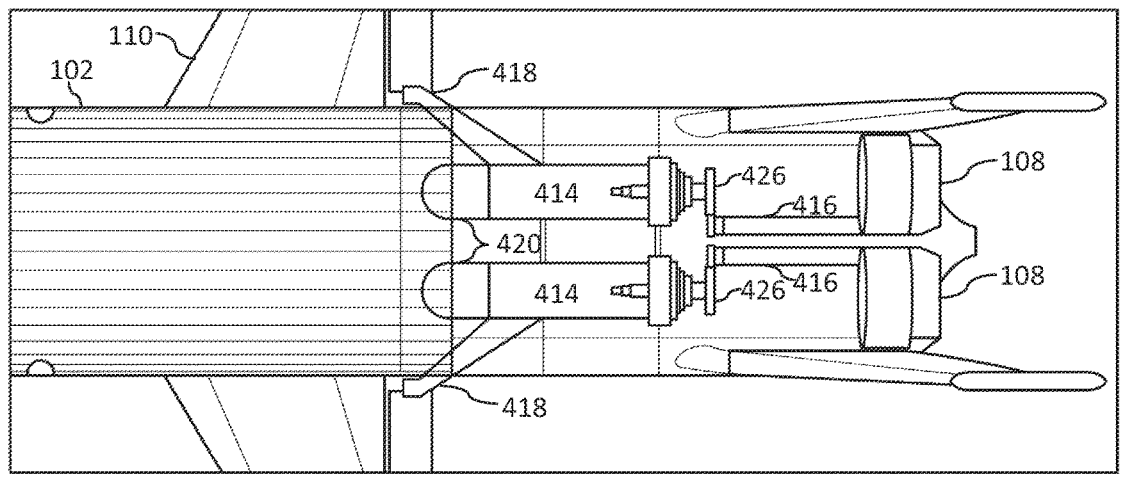
Figure 6C:
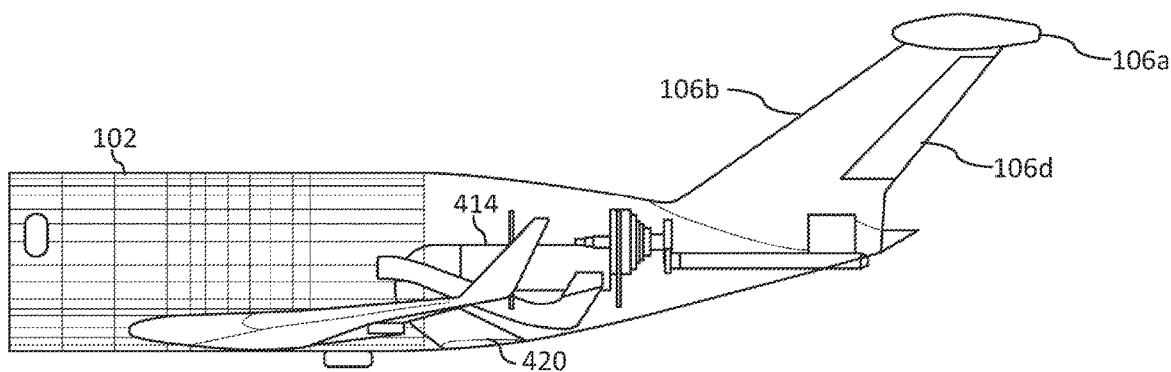

FIG. 6a illustrates the rear-mounted integrated propulsion system in a reverse orientation with the airframe omitted, while FIGS. 6b and 6c illustrate, respectively, top plan and side views of the rear-mounted integrated propulsion system installed in the aft-fuselage subassembly 102c. As illustrated, the rear-mounted integrated propulsion system can be configured in the reverse orientation where the exhaust from the engines 414 may be expelled forward and redirected toward the tail of the aircraft 100 via the rear-facing engine exhaust 420. An advantage of the reverse orientation is that the center of gravity of the engine(s) 414 is moved forward in the airframe 102 and away from the propulsor fans 108. The reverse orientation would be particularly useful in aircraft 100 with longer fuselages 102 where it is desirable to move the center of gravity forward to maintain balance during flight. While the drive shafts 416 are illustrated as traveling along the longitudinal center axis of the aft-fuselage subassembly 102c and between the set of propulsor fans 108, the drive shafts 416 may instead be routed along the outer, lateral sides (i.e., outboard) of the aft-fuselage subassembly 102c and around (to the left and right of) the set of propulsor fans 108.

Figure 7B:
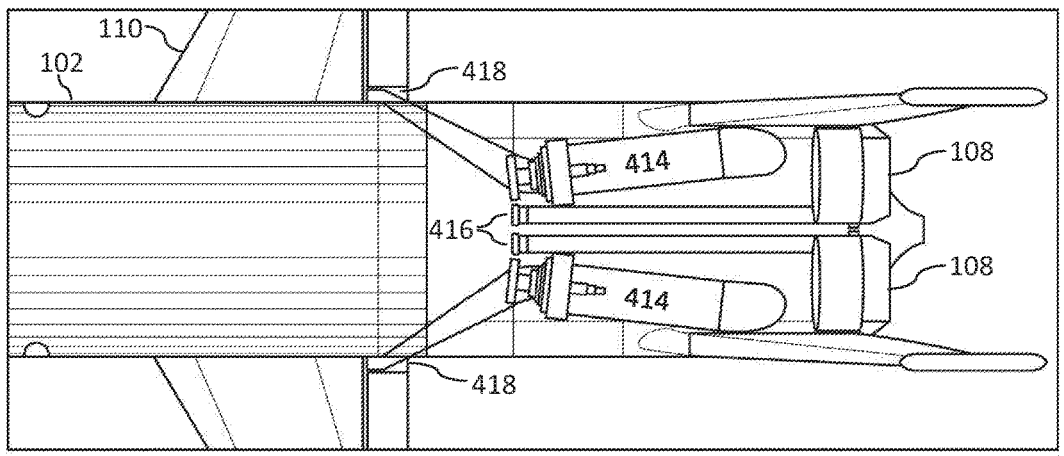
Figure 7C:
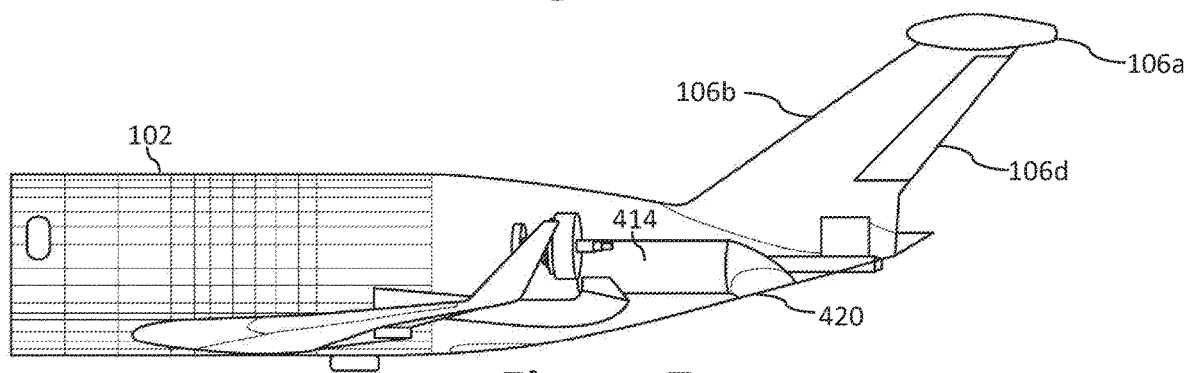

As illustrated in FIGS. 7a through 7c, the rear-mounted integrated propulsion system may be configured in a forward orientation where the exhaust from the engines 414 is expelled backward (aft) toward the tail of the aircraft 100 and expelled via the rear-facing engine exhaust 420, obviating the need to redirect the exhaust. In such an arrangement, the center of gravity of the engines 414 is moved aft/backward, toward the tail. A forward orientation may be useful in aircraft where the center of gravity need not be moved forward, such as the case may be with aircraft having shorter fuselages or where large payloads (e.g., intelligence, surveillance and reconnaissance (ISR)) are transported (e.g., mounted) toward the front of the aircraft 100. In other words, the engines 414 is moved aft/backward to maintain balance of hardware position in the front of the fuselage 102.

Figure 8B:
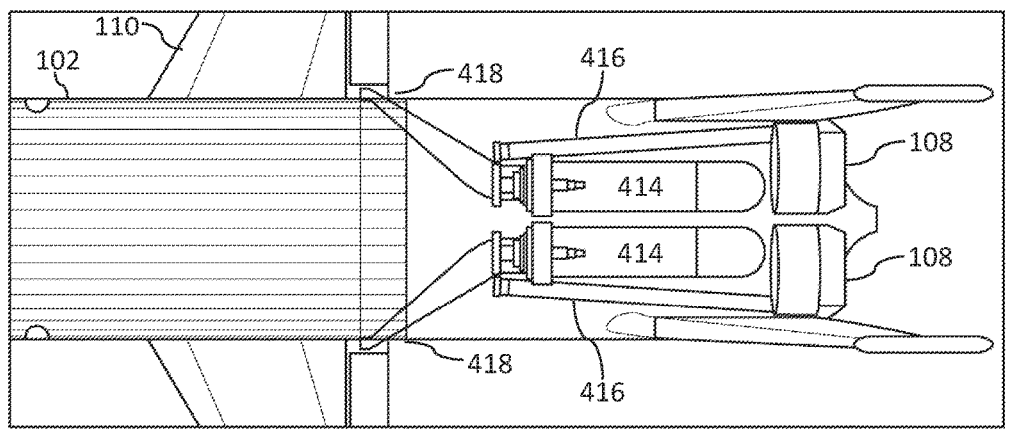
Figure 8C:
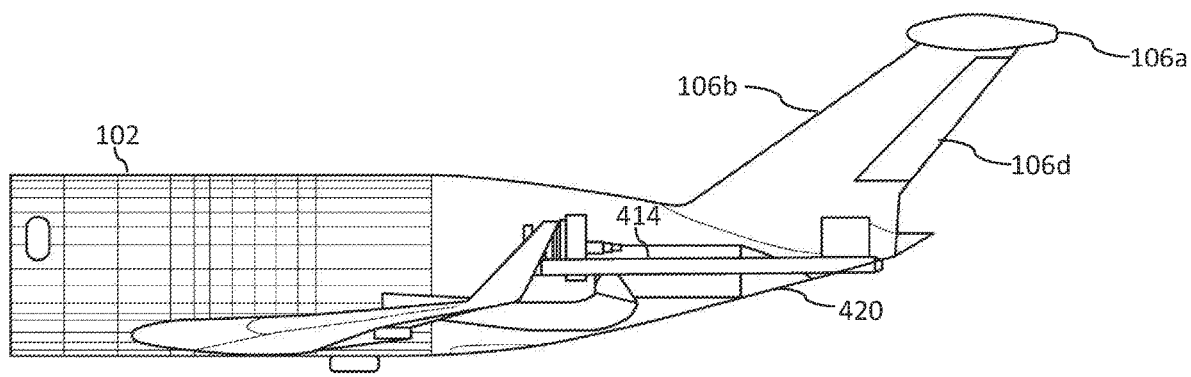

FIG. 7a illustrates the rear-mounted integrated propulsion system 700 in a forward orientation with the airframe omitted, while FIGS. 7b and 7c illustrate, respectively, top plan and side views of the rear-mounted integrated propulsion system installed in the aft-fuselage subassembly 102c. While the drive shafts 416 are illustrated as traveling along the longitudinal center axis of the aft-fuselage subassembly 102c and between the set of propulsor fans 108, the drive shafts 416 may instead be routed along the outer, lateral sides of the aft-fuselage subassembly 102c and around (to the left and right of) the set of propulsor fans 108 as illustrated in FIGS. 8a through 8c. Specifically, FIG. 8a illustrates the rear-mounted integrated propulsion system 800 in a forward orientation with the airframe omitted with the drive shafts 416 positioned along the outer, lateral sides of the aft-fuselage subassembly 102c, while FIGS. 8b and 8c illustrate, respectively, top plan and side views of the rear-mounted integrated propulsion system 800 installed in the aft-fuselage subassembly 102c.

Figure 9:
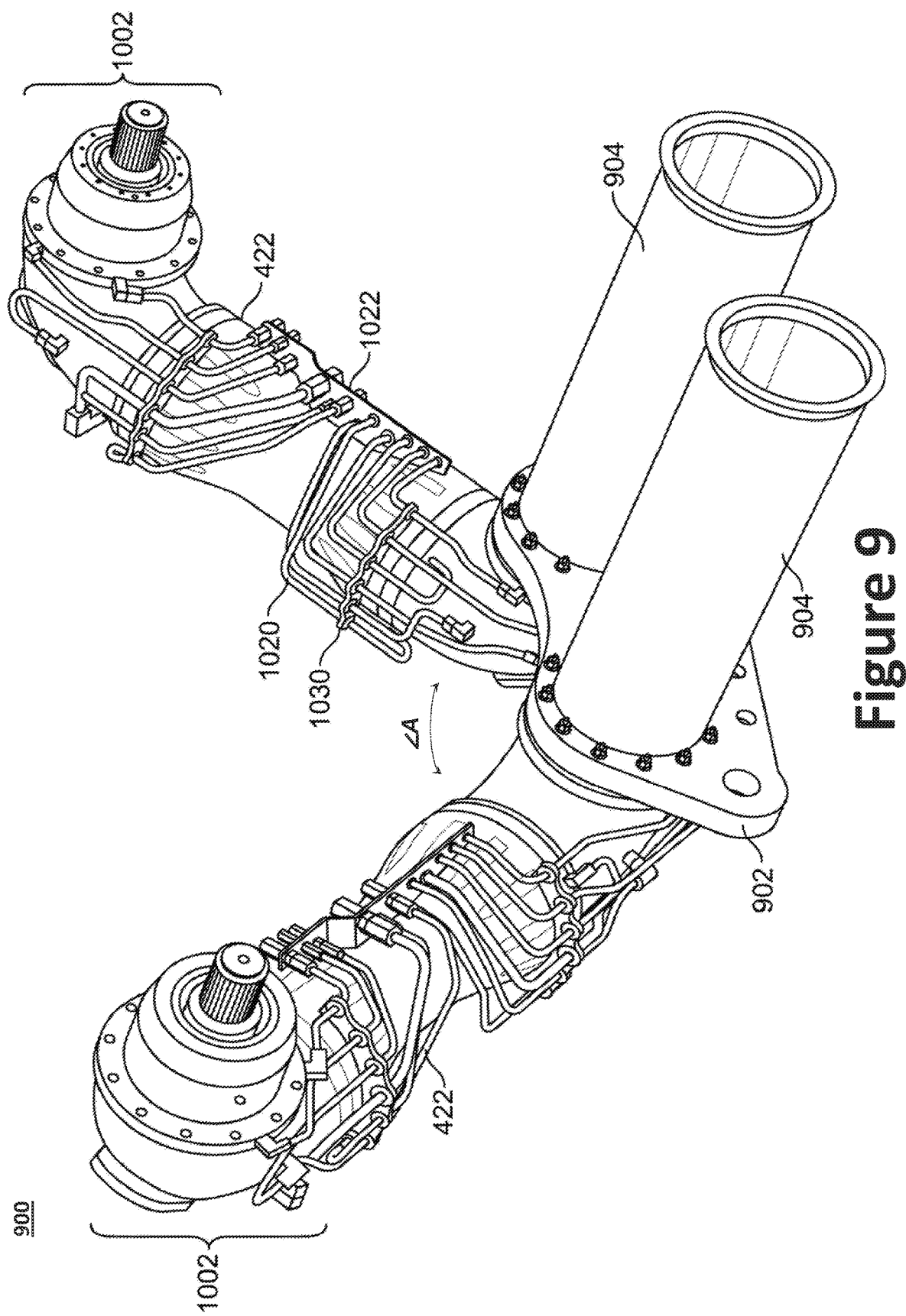
FIG. 9 illustrates a transmission assembly with two direction-reversing transmissions.

FIG. 9 illustrates a transmission assembly 900 with two direction-reversing transmissions 422 positioned relative to one another at a predetermined angle (i.e., LA) via a structural bulkhead 902. As will be appreciated, the predetermined angle may be adjusted as a function of the distance between the propulsor fans 108 and the location of the engines 414. In operation, the engine 414 generates a mechanical drive power, which is transferred to the propulsor fan 108 via a driveline. The driveline, in effect, transmits the mechanical drive power from the engine 414 to the propulsor fan 108, which then convert the mechanical drive power into thrust necessary for flight (i.e., aerodynamic flow power sufficient to overcome aircraft body drag and inertia in order to propel the aircraft 100). The driveline may include, for example, one or more drive shafts, couplers, and gearboxes 426, which provide speed and/or directional changes.

Whereas existing drive shaft designs may accept a mechanical drive power from an engine mounted inside the fuselage 102 and simply pass the mechanical drive power aft (forward-aft) to exit the main structure of the airframe in the same direction, the disclosed direction-reversing transmissions 422 are able to redirect the mechanical drive power from one direction (e.g., forward-to-aft) to face a different direction (e.g., aft-to-forward). More specifically, each direction-reversing transmission 422 accepts a mechanical drive power from one or more forward located engines 414 via a drive shaft 416 at its input end via a rotating shaft 1016. The direction-reversing transmission 422 then turns this mechanical drive power via two angled drive assemblies 1002 to face forward (aft-to-forward) at its input end and into the rear, non-critical face of the propulsor fans 108 (as best illustrated in FIG. 5b) via an upper rotating shaft 1016. The outer surface of each of the lower and the upper rotating shafts 1016 may be shaped to define splines that correspond to splines positioned on the drive shaft 416 or the center hub of the propulsor fan 108 (e.g., the aft face of the center hub). In one example, the input rotating shaft 1016 may rotate at 5,400 rpm (~5,000 horse power) to output to the propulsor fans 108 4,800 to 5,000 ft-lbs torque at the output rotating shaft 1016.

By positioning the engines 414 remotely from the propulsor fans 108 and by supplying the mechanical drive power to the propulsor fans 108 as its rear, non-critical face, the airstream to the forward-facing fan inlets 114 is not disturbed. In other words, the direction-reversing transmission 422, via a first angled drive assembly 1002, turns the path of the mechanical drive power from the engines 414 by a first predetermined angle (illustrated as a right angle) to pass the power path upward toward the propulsor fans 108. The direction-reversing transmission 422 then turns, via a second angled drive assembly 1002, the path of the mechanical drive power by a second predetermined angle (also illustrated as a right angle) into the aft face of the center hub of the propulsor fan 108. The transmission assembly 900 shown in FIG. 9 depicts a drive design for two engines 414 that supplying shaft power to two independent direction-reversing transmission 422 at the aft position of the aft-fuselage subassembly 102c. In certain aspects, the transmission assembly 900 may include shaft covers 904 to protect the rotating drive shafts 416 (which are omitted from FIG. 9) from the environment. The structural bulkhead 902 is provided to locate the lower end of each direction-reversing transmission 422 and to provide a load path into the aft-fuselage subassembly 102c.

FIGS. 10a through 10d illustrate, respectively, perspective, rear, side, and cut-away side views of an example direction-reversing transmission 422. The direction-reversing transmission 422 enables precise positioning of the input and output shafts at an angle needed to align with the drive shaft 416 from engine 414 and with the propulsor fans 108. Upon exiting the upper angled drive assembly 1002, the mechanical drive power may be transferred to the propulsor fans 108 input drive interface (e.g., the aft face of the center hub).

As illustrated, the direction-reversing transmission 422 generally comprises a set of angled drive assemblies 1002 separated by a linear drive shaft assembly 1004. Each of the angled drive assemblies 1002 serves to turn the mechanical drive power by a predetermined angle (e.g., a right angle, as illustrated), while the linear drive shaft assembly 1004 transmits the mechanical drive power between the angled drive assemblies 1002 when the angled drive assemblies 1002 cannot be coupled directly to one another due to distance requirement or to allow for relative movement therebetween. By incorporating the linear drive shaft assembly 1004 into the direction-reversing transmission 422 (as well as providing for sliding spline couplings), dimensional changes due to thermal changes are also accommodated. It is contemplated, however, that the linear drive shaft assembly 1004 may be omitted depending on the distance needed between the angled drive assemblies 1002.

Each of the angled drive assemblies 1002 comprises an angled housing 1006 and a set of rotating shaft assemblies 1012, where the angled housing 1006 is configured to position the set of rotating shaft assemblies 1012 as a predetermined angle relative to one another. The angled housing 1006 may further comprise a removable inspection cover 1008 to provide access to the inner components of the set of rotating shaft assemblies 1012. The inspection cover 1008 allows for easy access to the internal components of the direction-reversing transmissions 422 so that maintenance and/or repair costs are reduced. The removable inspection covers 1008 may be secured to the angled housing 1006 via a plurality of fasteners (e.g., bolts) or threaded directly to the angled housing 1006. The linear drive shaft assembly 1004 generally comprises a linear housing 1024 and, in certain aspects, a conduit manifold 1022 coupled thereto. The linear housing 1024 is configured to couple a rotating shaft assembly 1012 of a first angled drive assembly 1002 with a rotating shaft assembly 1012 of a second angled drive assembly 1002. For example, the linear housing 1024 may use sliding spline joints/connections 1028 to provide for alignments and fits needed between the rotating shafts 1016 to transfer the mechanical drive power from one angled drive assembly 1002 (e.g., the lower angled drive assembly 1002) to another angled drive assembly 1002 (e.g., the upper angled drive assembly 1002). As illustrated, the first angled drive assembly 1002 and the second angled drive assembly 1002 are aligned such that the output axis of rotation (Axis A) from the first angled drive assembly 1002 is the same as the input axis of rotation to the second angled drive assembly 1002.

Figure 11:
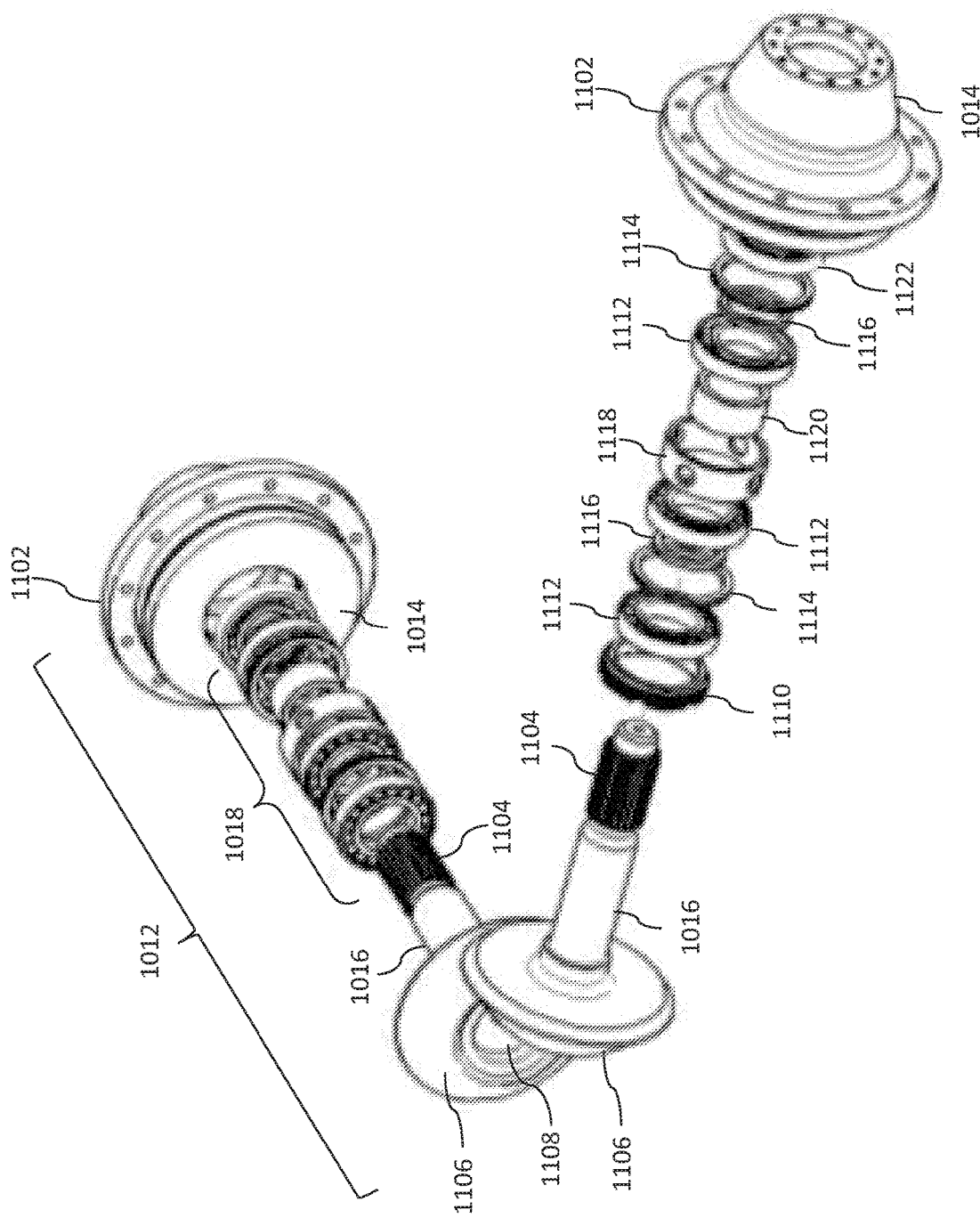
FIG. 11 illustrates a set of rotating shafts with shaft seal assemblies for use in a direction-reversing transmission.

FIG. 11 illustrates a set of rotating shafts with shaft seal assemblies 1018 for use in a direction-reversing transmission 422. An advantageous design feature of the direction-reversing transmission 422 is the use of welded flanges on the angled housings 1006 and the linear housing 1024, which allow for rotation and alignment of the attachment flanges 1026 before placing a final weld. To that end, the shaft mount 1014 of the rotating shaft assembly 1012 may include a flange 1102 to be sandwiched and fastened between the attachment flanges 1026 via one more fasteners 1010 (e.g., bolts). Once the alignment and fit has been adjusted and/or verified, the attachment flanges 1026 and the flange 1102 may be welded together in place. Each of the angled housings 1006 and the linear housing 1024 may be fabricated from, for example, metallic materials and/or composite materials, such as brass, copper alloys, aluminum, steel, alloy steel, stainless steel, titanium, Kevlar, boron, epoxy composites, carbon fiber, and the like.

To translate the mechanical drive power by the predetermined angle, each of the rotating shafts 1016 may include a precision bevel gear 1106 at one end and a splines 1104 (e.g., ridges) at the other end of the shaft portion. As illustrated, the precision bevel gear 1106 may include at its radial center a splined bore 1108, which may have an inner wall surface shaped to define splines. Accordingly, connection to and from this gear set is may be achieved via splines designed into the bevel gear 1106 and/or shaft components. The pitch surface of each precision bevel gear 1106 may be angled at 45 degrees relative to its axis of rotation to provide the 90-degree turn, though other angles are contemplated to achieve a desired turn angle. Notably, with reference to FIG. 10d, the length of the linear housing 1024 may be sized such that each of the rotating shafts 1016 may be identical, thereby reducing tooling cost and providing more flexibility in management of replacement parts. Where the distance between the upper and lower angled drive assembles 1002 is increased or decreased, however, the rotating shafts 1016 within the linear housing 1024 may be correspondingly adjusted in length. The rotating shafts 1016 may be fabricated from, for example, metallic materials, composite materials, and/or other aircraft-grade materials, such as brass, copper alloys, aluminum, steel, alloy steel, stainless steel, titanium, Kevlar, boron, epoxy composites, carbon fiber, and the like.

The transfer of mechanical drive power, at a high level, requires the use of precision bearings and the associated supporting accessories (e.g., lubrication system, bearing sets, retainers, seals, etc.). For example, a shaft seal assembly 1018 may be positioned between each shaft mount 1014 and its respective rotating shaft 1016 to constrain relative motion to only the desired motion, while reducing rotational friction and supporting radial and axial loads. As illustrated in FIG. 11, the shaft seal assembly 1018 may include, inter alia, an inboard retaining device 1110, a plurality of roller ball bearings 1112, a plurality of centric rings (e.g., a larger outer ring 1114 with a smaller inner ring 1116), and a centric spacer housing (e.g., a larger outer housing 1118 with a smaller inner housing 1120). Each of the ball bearings 1112 may include at least two races to contain a plurality of balls and transmit loads through the balls. The shaft seal assembly 1018 is secured within a cavity defined by the shaft mount 1014 via, and between, the inboard support (e.g., a ledge defined by the shaft mount 1014) and an outboard retaining device 1122. The shaft seal assembly 1018 may further comprise one or more radial seals to retain lubricate within the cavity defined by the shaft mount 1014. In certain aspects, a support washer may be positioned between the inboard support and the shaft seal assembly 1018 to support the backside of the shaft seal assembly 1018, such that the shaft seal assembly 1018 is fitted within the cavity. The shaft mount 1014 may be fabricated from one or more metallic materials, such as brass, copper alloys, aluminum, steel, alloy steel, stainless steel, titanium, etc.

The aircraft 100 may employ a lubrication system to clean, cool, seal, and mitigate corrosion/rust in its various components, including the engine 414 and the direction-reversing transmission 422. To that end, the exterior of the direction-reversing transmission 422 also facilitates the lubrication system supply and scavenge fluid conduits 1020. For example, the direction-reversing transmission 422 may further comprise a plurality of fluid conduits 1020 (e.g., pipes, hoses, etc.) and conduit manifold 1022 to bring all the fluid conduits 1020 to a common location for ease of service. The fluid conduits 1020 may be configured to couple with the lubrication system at the conduit manifold 1022, where the fluid conduits 1020 are used to provide lubricant to or from the various components of the direction-reversing transmission 422. For example, a network of fluid conduits 1020 may be positioned on the direction-reversing transmission 422 to convey lubricant from the lubrication system (via the conduit manifold 1022) to designated areas within the direction-reversing transmission 422 and back to the lubrication system (via the conduit manifold 1022). In certain aspects, different types of lubricant may be conveyed to different regions of the direction-reversing transmission 422 based on, for example, desired temperatures, viscosity, etc. Bushings 1030 may be provided along the length of fluid conduits 1020 to prevent un-wanted vibration of the fluid conduits 1020 between attachment points.

Figure 10B:
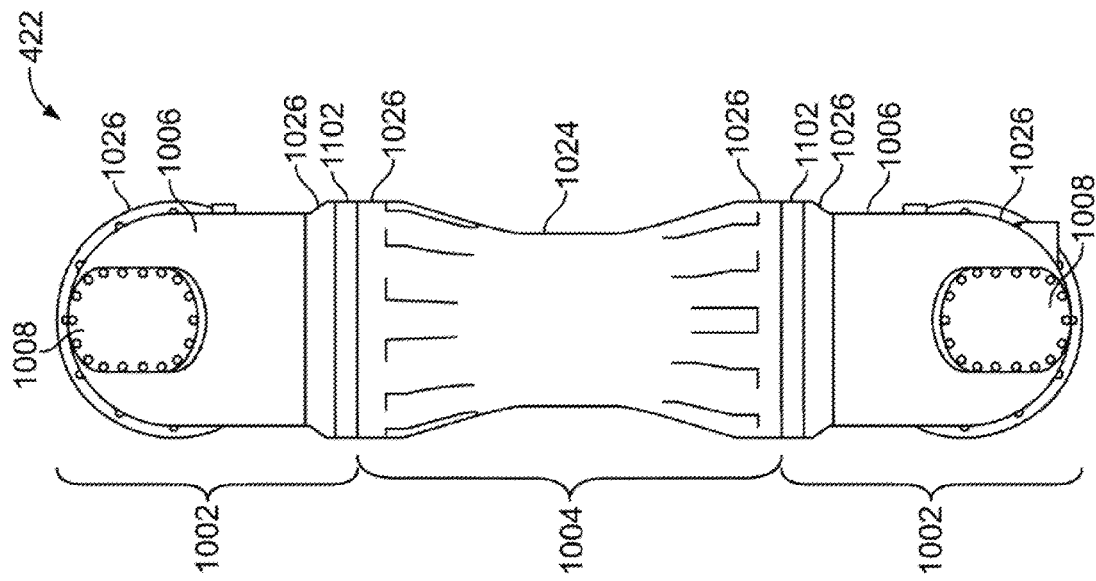
Figure 10A:
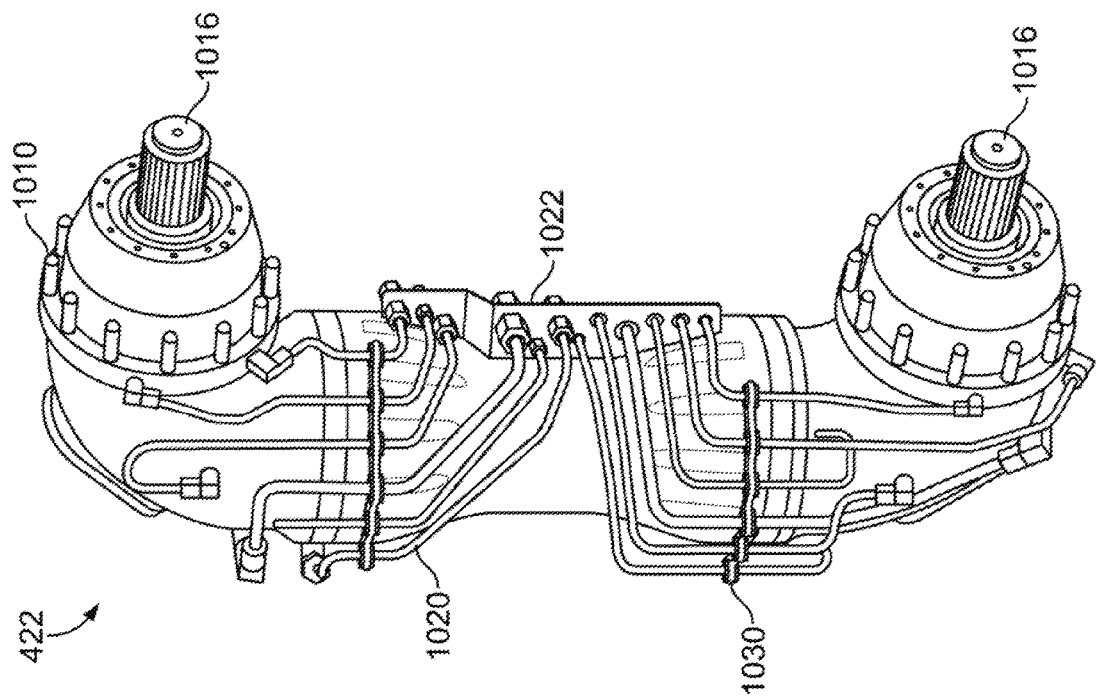
Figures 10E, 10F:
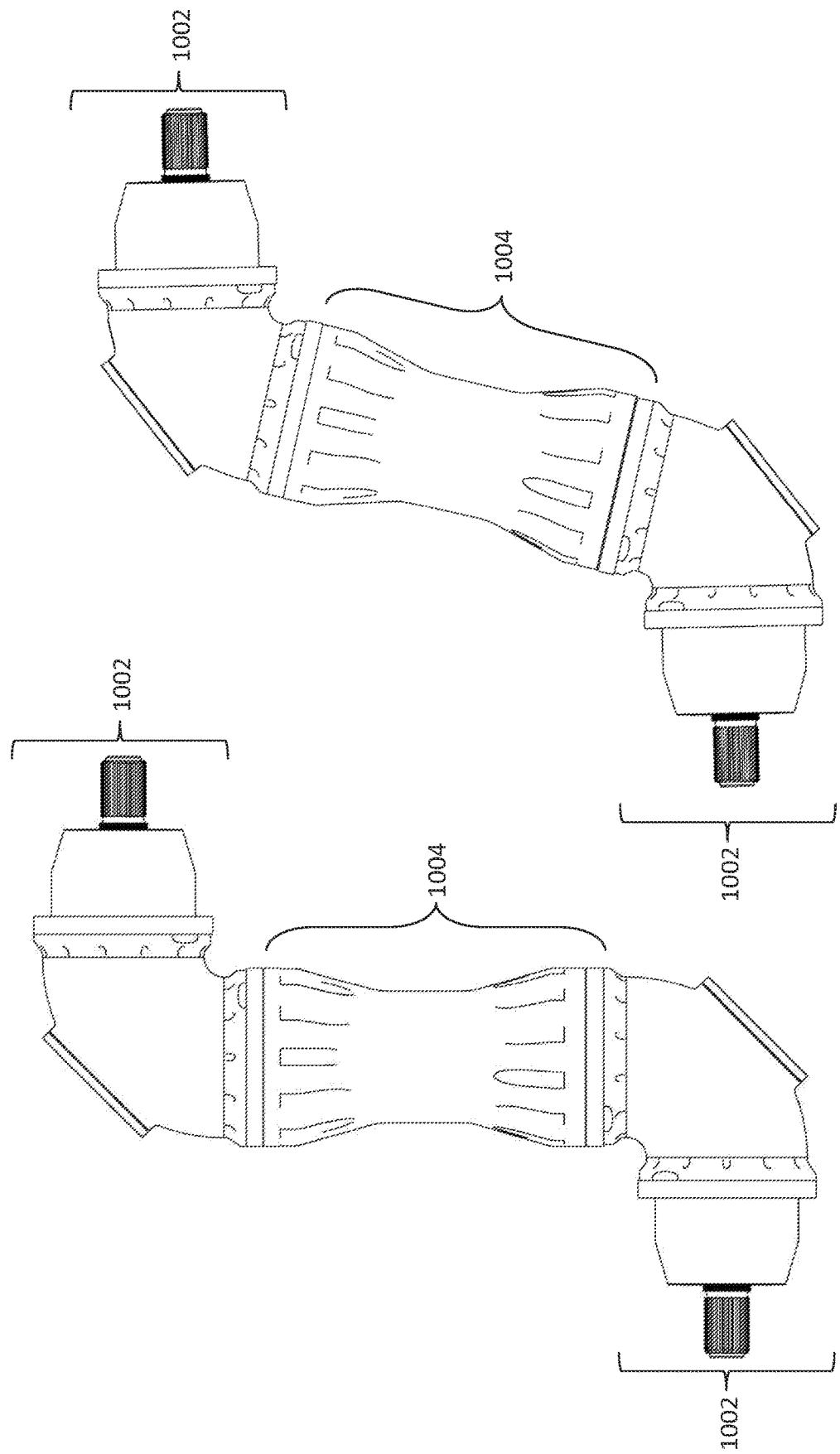

While the direction-reversing transmission 422 is generally describes as U-shaped with two 90-degree angled drive assemblies 1002, other configurations and angles are contemplated. For example, as illustrated in FIGS. 10e and 10f, where the direction of the axis of rotation need not be reversed, but rather, laterally offset, the upper angled drive assembly 1002 may be rotated relative to the lower angled drive assembly 1002 about axis A to provide an S-shaped transmission. Further, the drive assemblies 1002 need not be angled at 90 degrees, as illustrated in FIG. 10f. An advantage of the direction-reversing transmission 422 is that the angled drive assemblies 1002 may be rotated relative to one another about axis A without necessitating changes to the components thereof.

While the preceding examples illustrate a configuration in which one engine 414 drives one propulsor fan 108, the mechanically-distributed propulsion system architecture may instead use a single engine 414 to drive multiple propulsor fans 108. FIG. 12 illustrates an example arrangement 1200 where a single engine 414 is configured to drive multiple propulsor fans 108 via a single drive shaft 416. As illustrated, the single drive shaft 416 is mechanically coupled to two fan drive shafts 1202 via a gearbox. For clarity, the various housings and fairings are omitted from the figure to better illustrate the gearing arrangement. The gearbox may employ, for example, a plurality of bevel gears to translate mechanical drive power from the single drive shaft 416 to each of the two fan drive shafts 1202. To that end, each of the single drive shaft 416 from the engine 414 and the two fan drive shafts 1202 may include a bevel gear, where the bevel gear 1204 of the single drive shaft 416 is sized and shaped to drive each of the two fan drive shafts' 1202 bevel gears 1206. As illustrated, each of the fan drive shafts 1202 further includes a second bevel gear 1208 at its opposite end. The second bevel gear 1208 is sized and shaped to drive corresponding bevel gears positioned on each of the propulsor fans 108. As illustrated in FIG. 12, the two propulsor fans 108 may employ counter-rotation ordering. For example, one propulsor fan 108 may rotate in a clockwise manner, while the one or two adjacent propulsor fans 108 rotate in a counter-clockwise manner.

The above-cited patents and patent publications are hereby incorporated by reference in their entirety. Although various embodiments have been described with reference to a particular arrangement of parts, features, and like, these are not intended to exhaust all possible arrangements or features, and indeed many other embodiments, modifications, and variations may be ascertainable to those of skill in the art. Thus, it is to be understood that the disclosure may therefore be practiced otherwise than as specifically described above.

What is claimed is:

1. A mechanically-distributed propulsion system for use in an aircraft, the mechanically-distributed propulsion system comprising:
   an engine to generate a mechanical drive power wherein the engine is configured to expel exhaust forward;
   a drive shaft operatively coupled to the engine to receive the mechanical drive power;
   a direction-reversing transmission having a first rotating shaft and a second rotating shaft, the first rotating shaft operatively coupled to the drive shaft to receive the mechanical drive power,
   wherein the direction-reversing transmission is configured to redirect the mechanical drive power received at the first rotating shaft from a first direction to face a second direction at the second rotating shaft; and
   a propulsor fan coupled to the second rotating shaft to convert the mechanical drive power into thrust.

2. The mechanically-distributed propulsion system of claim 1, wherein the direction-reversing transmission comprises a first angled drive assembly to turn a path of the mechanical drive power by a first angle, and a second angled drive assembly to turn the path of the mechanical drive power by a second angle.

3. The mechanically-distributed propulsion system of claim 2, wherein each of the first angle and the second angle are equal.

4. The mechanically-distributed propulsion system of claim 2, wherein the first angled drive assembly and the second angled drive assembly are mechanically coupled to one another via a linear drive shaft assembly.

5. The mechanically-distributed propulsion system of claim 2, wherein the first angled drive assembly comprises the first rotating shaft having a first axis of rotation and a third rotating shaft having a third axis of rotation, the first rotating shaft and the third rotating shaft being mechanically coupled to one another via a first set of bevel gears, wherein the first axis of rotation and the third axis of rotation are positioned relative to one another at the first angle.

6. The mechanically-distributed propulsion system of claim 5, wherein the second angled drive assembly comprises the second rotating shaft having a second axis of rotation and a fourth rotating shaft having a fourth axis of rotation, the second rotating shaft and the fourth rotating shaft being mechanically coupled to one another via a second set of bevel gears, wherein the second axis of rotation and the fourth axis of rotation are positioned relative to one another at the second angle.

7. The mechanically-distributed propulsion system of claim 6, wherein the third rotating shaft and the fourth rotating shaft are mechanically coupled to one another via a sliding spline coupling.

8. The mechanically-distributed propulsion system of claim 1, wherein the direction-reversing transmission includes a conduit manifold and a plurality of fluid conduits to supply lubricant to the direction-reversing transmission.

9. The mechanically-distributed propulsion system of claim 1, wherein the engine is coupled to a rear-facing engine exhaust duct to redirect the exhaust aft.

10. An aerial vehicle comprising:
    a fuselage having a forward end and an aft end;
    a wing set operatively coupled to said fuselage;
    an empennage at the aft end of said fuselage, the empennage having a plurality of flight control surfaces;
    a propulsor fan integrated at the aft end of said fuselage, the aft end of said fuselage being shaped with a geometry to direct a boundary layer flowing over the fuselage to the propulsor fan;
    an engine positioned within the fuselage to generate a mechanical drive power wherein the engine is configured to expel exhaust toward the forward end; and
    a direction-reversing transmission to receive the mechanical drive power from the engine and to redirect the mechanical drive power from a first direction to face a second direction.

11. The aerial vehicle of claim 10, wherein the propulsor fan is positioned to ingest a boundary layer flowing over the fuselage.

12. The aerial vehicle of claim 11, wherein the propulsor fan is blended with the fuselage.

13. The aerial vehicle of claim 11, wherein the propulsor fan is blended with the fuselage via a set of integral nacelle cowling diffusers defined by the fuselage.

14. The aerial vehicle of claim 11, wherein the propulsor fan is integrated with an aft-fuselage subassembly of the fuselage.

15. The aerial vehicle of claim 11, wherein the fuselage includes a center fuselage subassembly having a double-bubble cross-section.

16. The aerial vehicle of claim 14, wherein the aft-fuselage subassembly is fabricated as a semi-monocoque structure having a plurality of fuselage-skin pieces fastened to an internal structure.

17. The aerial vehicle of claim 10, wherein the first direction is from the forward end and the second direction is toward the forward end.

18. The aerial vehicle of claim 10, wherein the fuselage includes a center fuselage subassembly having a double-bubble cross-section.

19. The aerial vehicle of claim 10, further comprising a rear-facing engine exhaust duct to redirect the exhaust from the engine toward the aft end.

20. A method of operating an aircraft having a mechanically-distributed propulsion system, the method comprising:
generating a mechanical drive power using an engine, wherein the engine is configured to expel exhaust toward a forward end of the aircraft;
receiving the mechanical drive power from the engine via a drive shaft;
receiving the mechanical drive power from the drive shaft via a direction-reversing transmission, wherein the direction-reversing transmission comprises a first rotating shaft and a second rotating shaft, the first rotating shaft being operatively coupled to the drive shaft;
redirecting the exhaust toward an aft end of the aircraft using a rear-facing engine exhaust;
redirecting the mechanical drive power received at the first rotating shaft from a first direction to face a second direction at the second rotating shaft; and
rotating a propulsor fan to convert the mechanical drive power into thrust, wherein the propulsor fan is operatively coupled to the second rotating shaft.

* * * * *